US012650927B2

(12) United States Patent
Nukata et al.

(10) Patent No.: US 12,650,927 B2
(45) Date of Patent: Jun. 9, 2026

(54) STORAGE SYSTEM AND STORAGE CONTROL METHOD

(71) Applicant: Hitachi Vantara, Ltd., Yokohama (JP)

(72) Inventors: Tetsuaki Nukata, Tokyo (JP); Shintaro Ito, Tokyo (JP); Takahiro Yamamoto, Tokyo (JP); Yoshinori Ohira, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 0 days.

(21) Appl. No.: 18/828,085

(22) Filed: Sep. 9, 2024

(65) Prior Publication Data

US 2025/0328473 A1      Oct. 23, 2025

(30) Foreign Application Priority Data

Apr. 19, 2024    (JP) ................................. 2024-068407

(51) Int. Cl.
  *G06F 12/08*      (2016.01)
  *G06F 12/02*      (2006.01)
  *G06F 12/0891*      (2016.01)
(52) U.S. Cl.
  CPC ...... *G06F 12/0891* (2013.01); *G06F 12/0253* (2013.01)
(58) Field of Classification Search
  CPC .......................... G06F 12/0891; G06F 12/0253
  See application file for complete search history.

(56) References Cited

U.S. PATENT DOCUMENTS

| | | | |
|---|---|---|---|
| 11,609,698 B1 * | 3/2023 | Ito | G06F 3/0616 |
| 11,782,842 B1 * | 10/2023 | Sabo | G06F 12/0868 |
| | | | 711/113 |
| 2017/0344478 A1 * | 11/2017 | Feng | G06F 11/1471 |
| 2018/0113810 A1 * | 4/2018 | Simionescu | G06F 3/0689 |
| 2023/0315301 A1 | 10/2023 | Ito et al. | |

FOREIGN PATENT DOCUMENTS

JP            2023-152247 A      10/2023

* cited by examiner

*Primary Examiner* — Masud K Khan
(74) *Attorney, Agent, or Firm* — Foley & Lardner LLP

(57) ABSTRACT

A nonvolatile storage device has a permanent area and a cache data log area. A memory has a cache data area. A processor stores data related to a write request in the cache data area, stores a log header having a sequence number and data stored in the memory in a cache data log area, responds to a write request source, registers a sequence number of the log header in an invalidation table, destages the data stored in the memory to the permanent area, creates a log header having a sequence number, registers the sequence number in the invalidation table, and when the cache data log area is collected by a garbage collection method, deletes a log header having a sequence number older than the sequence number registered in the invalidation table and corresponding data from the cache data log area to release the storage area.

9 Claims, 29 Drawing Sheets

SYSTEM CONFIGURATION

SYSTEM CONFIGURATION

PHYSICAL CONFIGURATION OF NODE

LOGICAL CONFIGURATION OF NODE

COMPRESSION FUNCTION

MEMORY CONFIGURATION DIAGRAM

STORAGE DEVICE
CONFIGURATION DIAGRAM

SOFTWARE MODULE DIAGRAM

LOG HEADER                    103231

| FIELD | VALUE |
|---|---|
| LOG SEQUENCE NUMBER | 50 |
| UPDATE ADDRESS | 0x00002000 |
| UPDATE SIZE | 8192 |
| LOG TYPE | CACHE DATA LOG |

INVALIDATION TABLE

10324

| CACHE SEGMENT NUMBER | LOG SEQUENCE NUMBER | TOTAL LOG SIZE |
|:---:|:---:|:---:|
| 0 | 60 | 1024byte |
| 1 | 40 | 64KiB |
| 2 | 65 | 12KiB |
| ... | ... | ... |

READ PROCESSING

WRITE PROCESSING

ASYNCHRONOUS
DESTAGE PROCESSING

FIG. 14

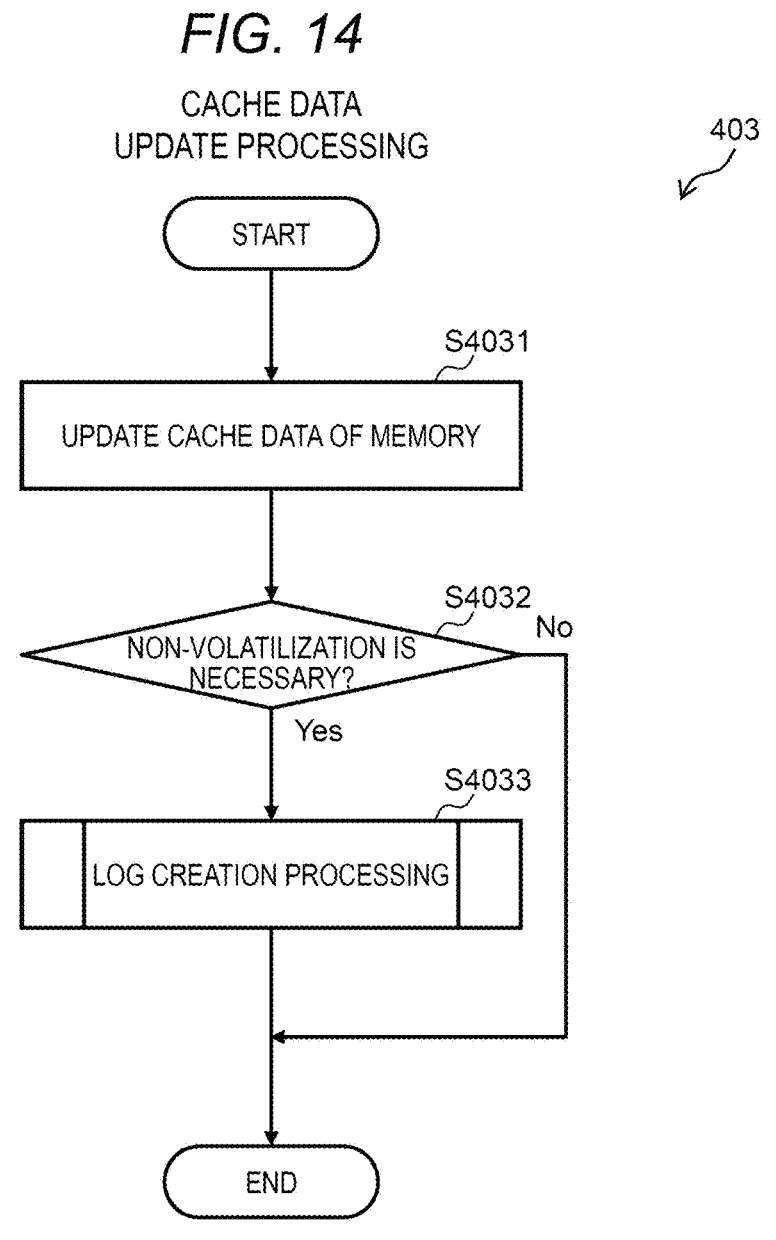

CACHE DATA
UPDATE PROCESSING

403

START

S4031

UPDATE CACHE DATA OF MEMORY

S4032

NON-VOLATILIZATION IS
NECESSARY?                    No

Yes

S4033

LOG CREATION PROCESSING

END

LOG CREATION PROCESSING

DETERMINATION PROCESSING

405

```
        ( START )
            |
            v
  S4051
  +-------------------------+
  |  | LOG SAVING PROCESSING |  |
  +-------------------------+
            |
            v
        ( END )
```

LOG SAVING PROCESSING

FIG. 18

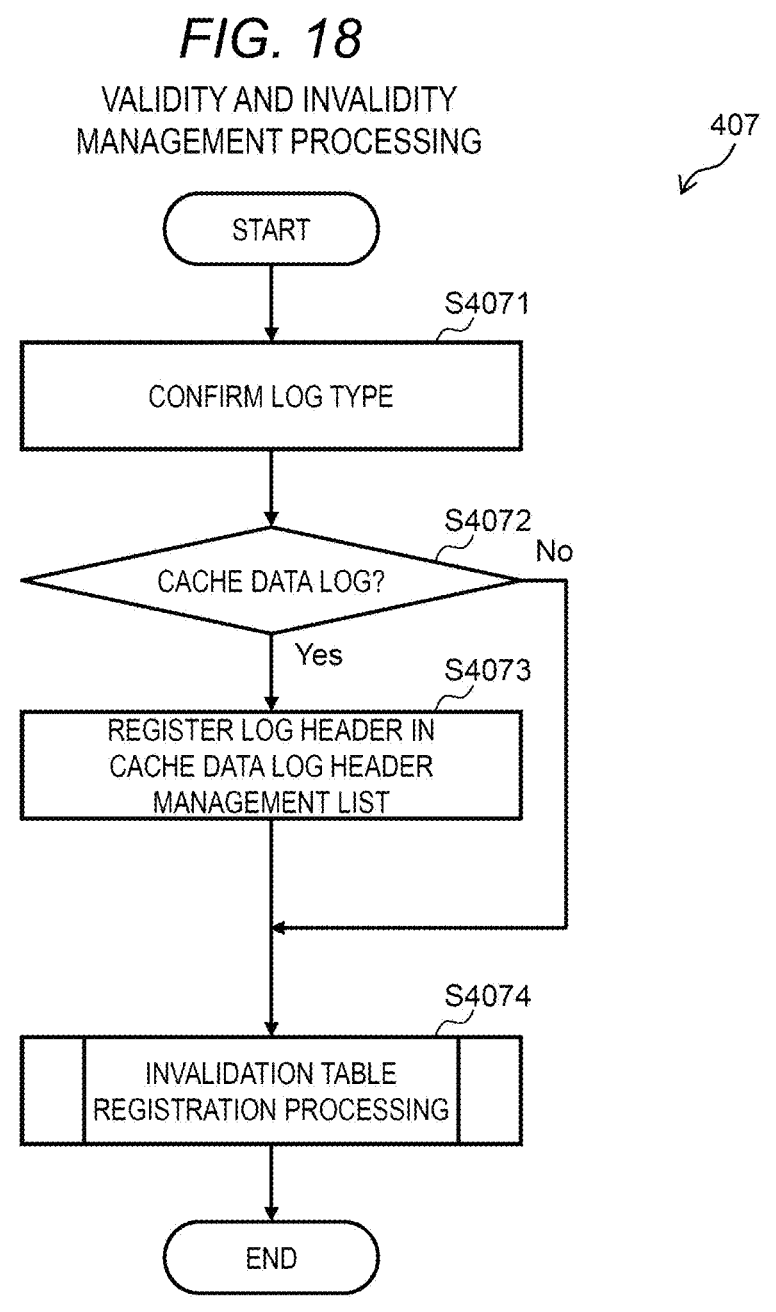

VALIDITY AND INVALIDITY
MANAGEMENT PROCESSING

407

```
        ( START )
            │
            ▼
   ┌──────────────────────┐  S4071
   │   CONFIRM LOG TYPE    │
   └──────────────────────┘
            │
            ▼
        S4072       No
      ╱─────────────╲────────┐
     ╱ CACHE DATA LOG?╲       │
      ╲─────────────╱        │
            │ Yes            │
            ▼                │
   ┌──────────────────────┐  │  S4073
   │ REGISTER LOG HEADER IN│  │
   │ CACHE DATA LOG HEADER │  │
   │   MANAGEMENT LIST     │  │
   └──────────────────────┘  │
            │◄───────────────┘
            ▼
   ┌┬──────────────────────┬┐  S4074
   ││   INVALIDATION TABLE  ││
   ││ REGISTRATION PROCESSING││
   └┴──────────────────────┴┘
            │
            ▼
         ( END )
```

INVALIDATION TABLE REGISTRATION PROCESSING

CACHE DATA LOG GARBAGE COLLECTION PROCESSING

EACH-CACHE-SEGMENT RE-LOGGING PROCESSING

INVALIDATION TABLE  10324

| CACHE BLOCK NUMBER | LOG SEQUENCE NUMBER |
|---|---|
| 0 | 60 |
| 1 | 40 |
| 2 | 65 |
| ... | ... |

FIG. 23

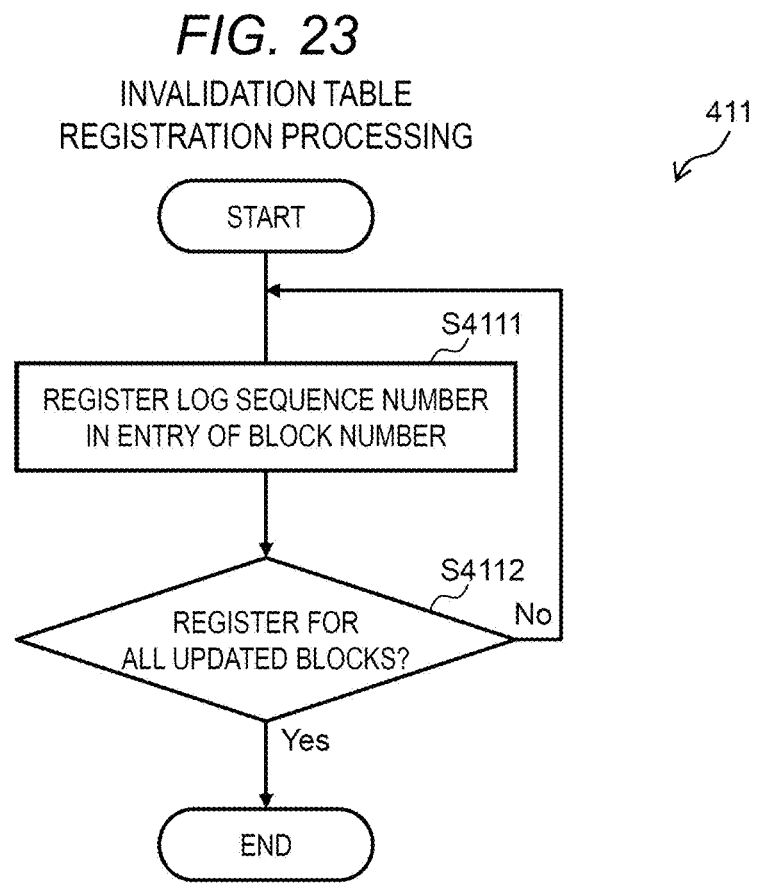

INVALIDATION TABLE
REGISTRATION PROCESSING

411

START

S4111

REGISTER LOG SEQUENCE NUMBER
IN ENTRY OF BLOCK NUMBER

S4112

REGISTER FOR
ALL UPDATED BLOCKS?          No

Yes

END

FIG. 24

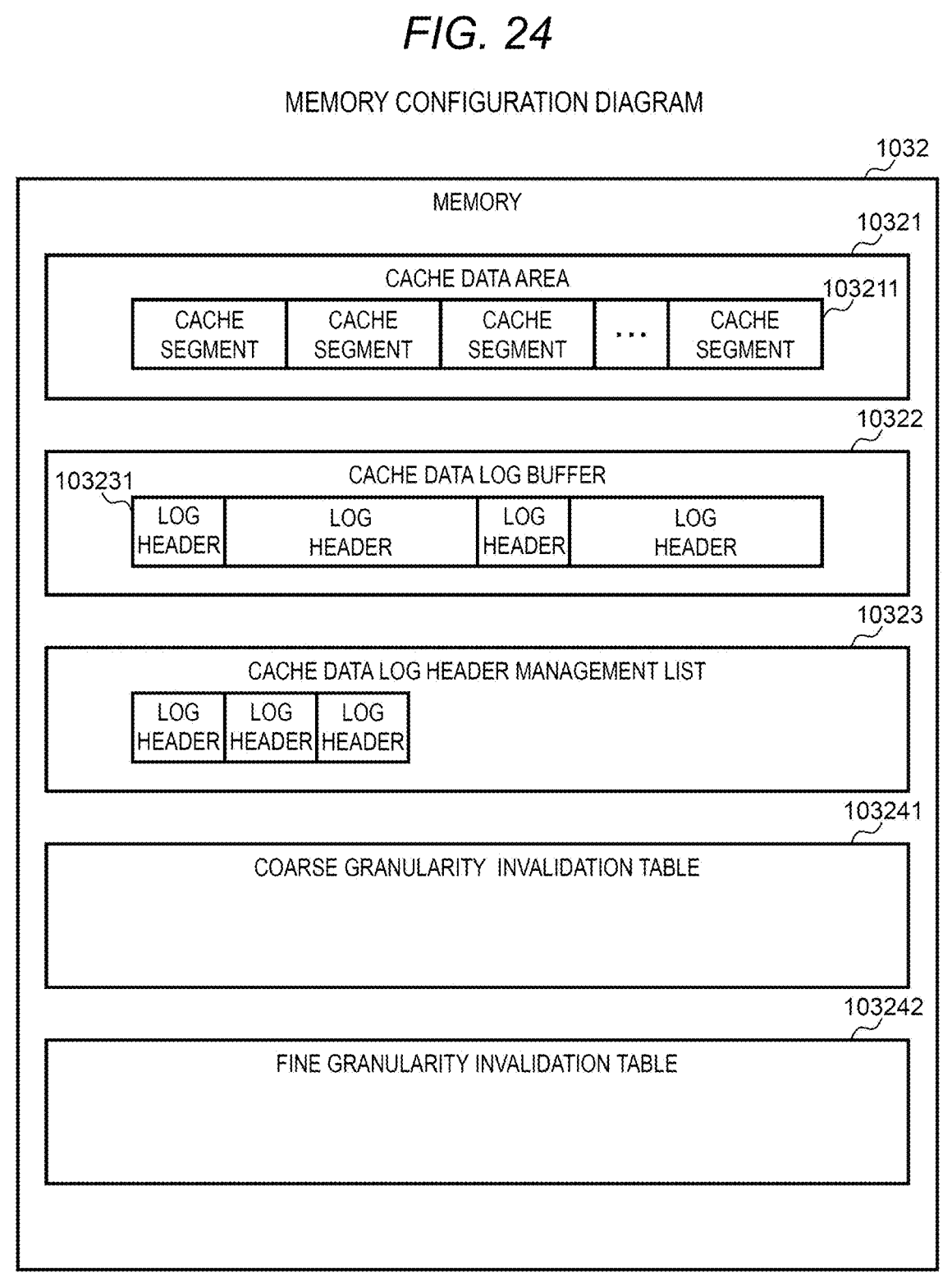

MEMORY CONFIGURATION DIAGRAM

1032

MEMORY

10321

CACHE DATA AREA

| CACHE SEGMENT | CACHE SEGMENT | CACHE SEGMENT | . . . | CACHE SEGMENT |

103211

10322

CACHE DATA LOG BUFFER

103231

| LOG HEADER | LOG HEADER | LOG HEADER | LOG HEADER |

10323

CACHE DATA LOG HEADER MANAGEMENT LIST

| LOG HEADER | LOG HEADER | LOG HEADER |

103241

COARSE GRANULARITY INVALIDATION TABLE

103242

FINE GRANULARITY INVALIDATION TABLE

COARSE GRANULARITY INVALIDATION TABLE  103241

| CACHE SEGMENT NUMBER | LOG SEQUENCE NUMBER | TOTAL LOG SIZE | POINTER TO FINE GRANULARITY INVALIDATION TABLE |
|---|---|---|---|
| 0 | 60 | 1024byte | 0x60000000 |
| 1 | 40 | 64KiB | 0x40000000 |
| 2 | 65 | 12KiB | - |
| ... | ... | ... | ... |

*FIG. 26*

FINE GRANULARITY INVALIDATION TABLE     103242

| BLOCK NUMBER IN CACHE SEGMENT | LOG SEQUENCE NUMBER |
|---|---|
| 0 | 110 |
| 1 | 120 |
| 2 | 120 |
| ... | ... |

FIG. 27

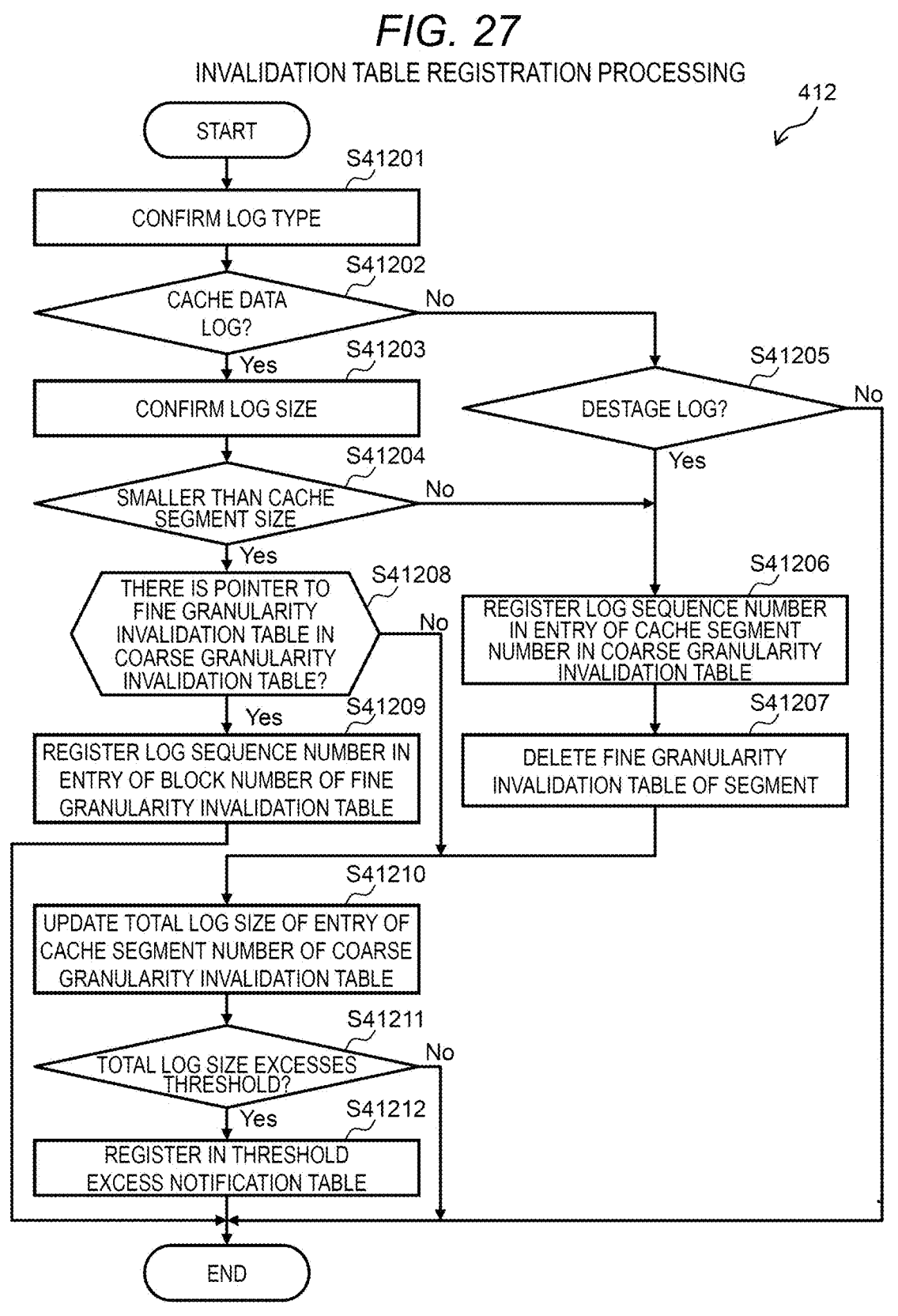

INVALIDATION TABLE REGISTRATION PROCESSING

412

START

S41201

CONFIRM LOG TYPE

S41202

CACHE DATA LOG? —No→

S41203 (Yes)

CONFIRM LOG SIZE

S41204

SMALLER THAN CACHE SEGMENT SIZE —No→

S41205

DESTAGE LOG? —No→

(Yes)

S41206

REGISTER LOG SEQUENCE NUMBER IN ENTRY OF CACHE SEGMENT NUMBER IN COARSE GRANULARITY INVALIDATION TABLE

S41207

DELETE FINE GRANULARITY INVALIDATION TABLE OF SEGMENT

S41208

THERE IS POINTER TO FINE GRANULARITY INVALIDATION TABLE IN COARSE GRANULARITY INVALIDATION TABLE? —No→

Yes

S41209

REGISTER LOG SEQUENCE NUMBER IN ENTRY OF BLOCK NUMBER OF FINE GRANULARITY INVALIDATION TABLE

S41210

UPDATE TOTAL LOG SIZE OF ENTRY OF CACHE SEGMENT NUMBER OF COARSE GRANULARITY INVALIDATION TABLE

S41211

TOTAL LOG SIZE EXCESSES THRESHOLD? —No→

S41212 (Yes)

REGISTER IN THRESHOLD EXCESS NOTIFICATION TABLE

END

EACH-CACHE-SEGMENT RE-LOGGING PROCESSING

COARSE GRANULARITY INVALIDATION TABLE 103241

| CACHE SEGMENT NUMBER | LOG SEQUENCE NUMBER |
|---|---|
| 0 | 60 |
| 1 | 40 |
| 2 | 65 |
| ... | ... |

1

STORAGE SYSTEM AND STORAGE CONTROL METHOD

BACKGROUND OF THE INVENTION

1. Field of the Invention

The present invention relates to a storage system and a storage control method.

2. Description of Related Art

In the related art, to implement a storage system having both performance and reliability, there is a technique disclosed in JP2023-152247A (PTL 1). This publication discloses that "in a storage system including a nonvolatile storage device, a storage controller that controls reading from and writing to the storage device, and a memory, the storage controller generates a log and stores the generated log in a log memory when reading and writing, writes the log stored in the memory to the storage device, and collects the capacity related to a storage area of the memory in which the log written to the storage device is stored. When collecting an empty area of the memory, the storage controller performs a base image saving method in which the empty area is collected by writing the logs to the storage device in units of storage areas having a plurality of logs and a garbage collection method in which the empty area is collected by writing the log to the storage device in units of logs.

CITATION LIST

Patent Literature

PTL 1: JP2023-152247A

SUMMARY OF THE INVENTION

In the technique described above, a log of cache data is written in a log area on the storage device in a write-once format. As a collection method of the empty area, the garbage collection method is used in which invalid logs are excluded and valid old logs are copied to the end of the log area as new logs. However, each time a log is overwritten or deleted from the cache by asynchronous destage, a search is performed to see whether there is a log that can be invalidated, which is costly. Therefore, an object of the present invention is to improve performance by performing high-speed invalidation determination without a search to see whether the invalidation can be performed for each log.

To achieve the object, one representative storage system of the invention is a storage system including: a nonvolatile storage device; a processor configured to operate as a storage controller for processing read and write from and to the storage device; and a memory, in which the storage device has a permanent area in which data is destaged and permanently stored and a cache data log area in which a cache data log is stored to make the cache data log non-volatile, the memory has a cache data area, and the processor is configured to when receiving a write request, store data related to the write request in the cache data area provided in the memory, create a log header having a sequence number related to memory storage of the data, stores the log header and the data stored in the memory in the cache data log area of the storage device, responds to a request source of the write request, and registers the sequence number of the created log header in an invalidation table, destage the data stored in the memory to the permanent area of the storage device, create a log header having a sequence number related to the destage, and register the sequence number in the invalidation table, and when the cache data log area of the storage device is collected by a garbage collection method, delete a log header having a sequence number older than the sequence number registered in the invalidation table and data related to the log header from the cache data log area to release the storage area.

One representative storage control method of the invention is a storage control method for controlling a storage system, the storage system including a nonvolatile storage device, a processor configured to operate as a storage controller for processing read and write from and to the storage device, and a memory, the storage device having a permanent area in which data is destaged and permanently stored and a cache data log area in which a cache data log is stored to make the cache data log non-volatile, the memory having a cache data area, the storage control method including: by the processor, when receiving a write request, storing data related to the write request in the cache data area provided in the memory; creating a log header having a sequence number related to memory storage of the data, storing the log header and the data stored in the memory in the cache data log area of the storage device, responding to a request source of the write request, and registering the sequence number of the created log header in an invalidation table; destaging the data stored in the memory to the permanent area of the storage device, creating a log header having a sequence number related to the destage, and registering the sequence number in the invalidation table; and when the cache data log area of the storage device is collected by a garbage collection method, deleting a log header having a sequence number older than the sequence number registered in the invalidation table and data related to the log header from the cache data log area to release the storage area.

According to the present invention, a high-performance storage system can be implemented. Problems, configurations, and effects other than those described above will become apparent by the following description of embodiments.

BRIEF DESCRIPTION OF THE DRAWINGS

FIG. 14 is a flowchart of cache data update processing;

FIG. 16 is a flowchart of determination processing;

FIG. 18 is a flowchart of validity and invalidity manage-ment processing;

FIG. 23 is a flowchart of invalidation table registration processing according to Embodiment 2;

FIG. 24 is a diagram showing an example of a memory configuration diagram according to Embodiment 3;

FIG. 26 is a diagram showing a structure of a fine granularity invalidation table according to Embodiment 3;

FIG. 27 is a flowchart of an invalidation table registration processing according to Embodiment 3;

FIG. 29 is a diagram showing a structure of a coarse granularity invalidation table according to Embodiment 4.

DESCRIPTION OF EMBODIMENTS

Hereinafter, embodiments s of the invention will be described with reference to the drawings. The embodiment relates to, for example, a storage system including a plurality of storage nodes on which one or more software defined storages (SDSs) are mounted.

Hereinafter, one embodiment will be described in detail.

Embodiment 1

Figure 1:
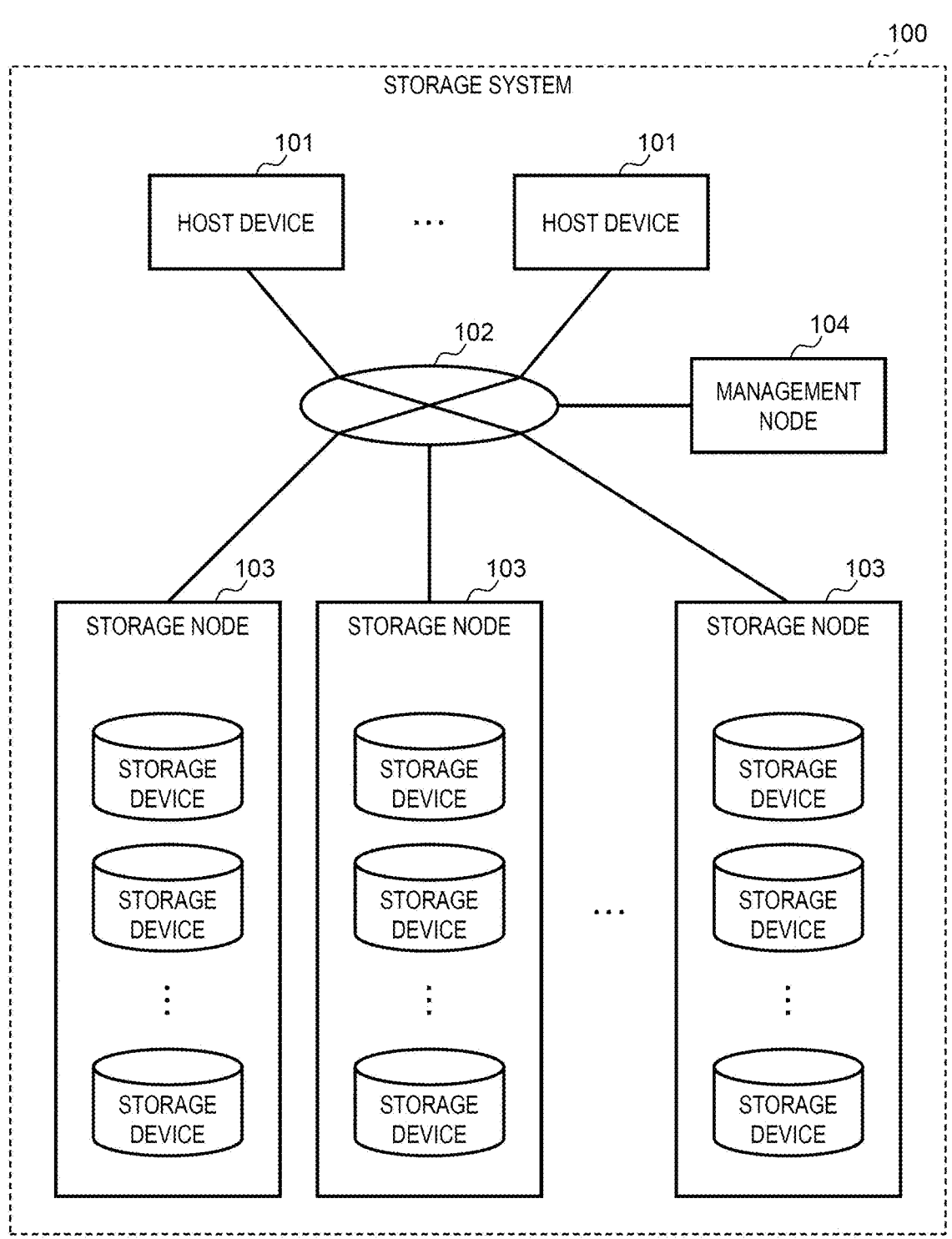
FIG. 1 is a configuration diagram of a storage system according to Embodiment 1.

FIG. 1 is a diagram showing a storage system according to Embodiment 1. A storage system 100 includes one or more host devices 101, one or more storage nodes 103, and a management node 104. The host devices 101, the storage nodes 103, and the management node 104 are connected via a network 102.

The host device 101 is a general-purpose computer used by a user. The host device 101 may be a physical computer or may be a virtual computer executed on the physical computer. The host device 101 transmits, for example, a read request or a write request to the storage node 103 in response to a request from a user operation or an application program. The "read request or the write request" is referred to as an "I/O request".

The network 102 may be, for example, a storage area network (SAN) or a local area network (LAN). A connection standard of the network 102 may be, for example, Fibre Channel or Ethernet (registered trademark).

The storage node 103 is a computer including a storage device. The storage node 103 may be, for example, a general-purpose server. The storage node 103 provides the host device 101 with a storage area for reading and writing data.

The management node 104 is a computer used by an administrator to manage the entire storage system 100. The management node 104 manages two or more storage nodes as a "cluster". One or more clusters may be included in the storage system 100.

The storage system 100 may be on-premises, cloud, or a hybrid thereof. The network 102 may be, for example, a virtual network on a cloud, and the storage node 103 may be, for example, a virtual server on a cloud.

Figure 2:
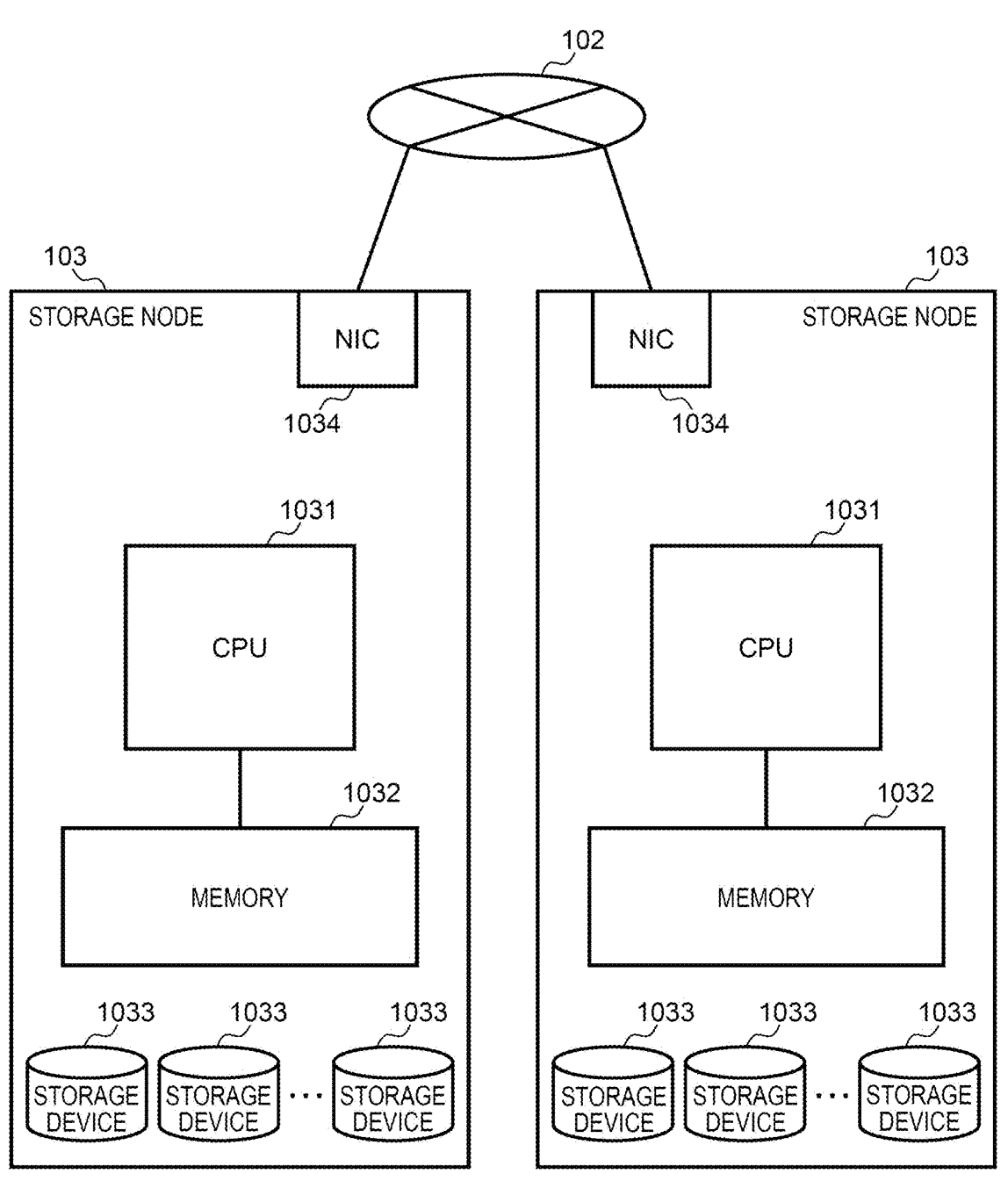
FIG. 2 is a diagram showing an example of a physical configuration of a storage node.

FIG. 2 is a diagram showing an example of a physical configuration of the storage node 103. The storage node 103 includes a central processing unit (CPU) 1031, a memory 1032, one or more storage devices 1033, and a network interface card (NIC) 1034.

The CPU 1031 is a processor device that controls opera-tions of the storage node. The memory 1032 is a semicon-ductor memory that temporarily holds the application pro-gram and the data. The memory 1032 may be, for example, a static random access memory (SRAM) or a dynamic RAM (DRAM). The CPU 1031 controls the operations of the storage node by executing the application program held by the memory 1032.

The storage device 1033 is a nonvolatile storage device. The storage device 1033 provides a physical storage area for reading or writing the data in response to the I/O request from the host device 101. The storage device 1033 may be, for example, a hard disk drive (HDD), a solid state drive (SSD), or a non-volatile memory express (NVMe) drive.

The NIC 1034 is an interface for the storage node 103 to communicate with the host device 101, another storage node 103, or the management node 104 via the network 102. The NIC 1034 may be, for example, an FC card in addition to the NIC. The NIC 1034 performs protocol control in commu-nication with the host device 101, another storage node 103, or the management node 104.

Figure 3:
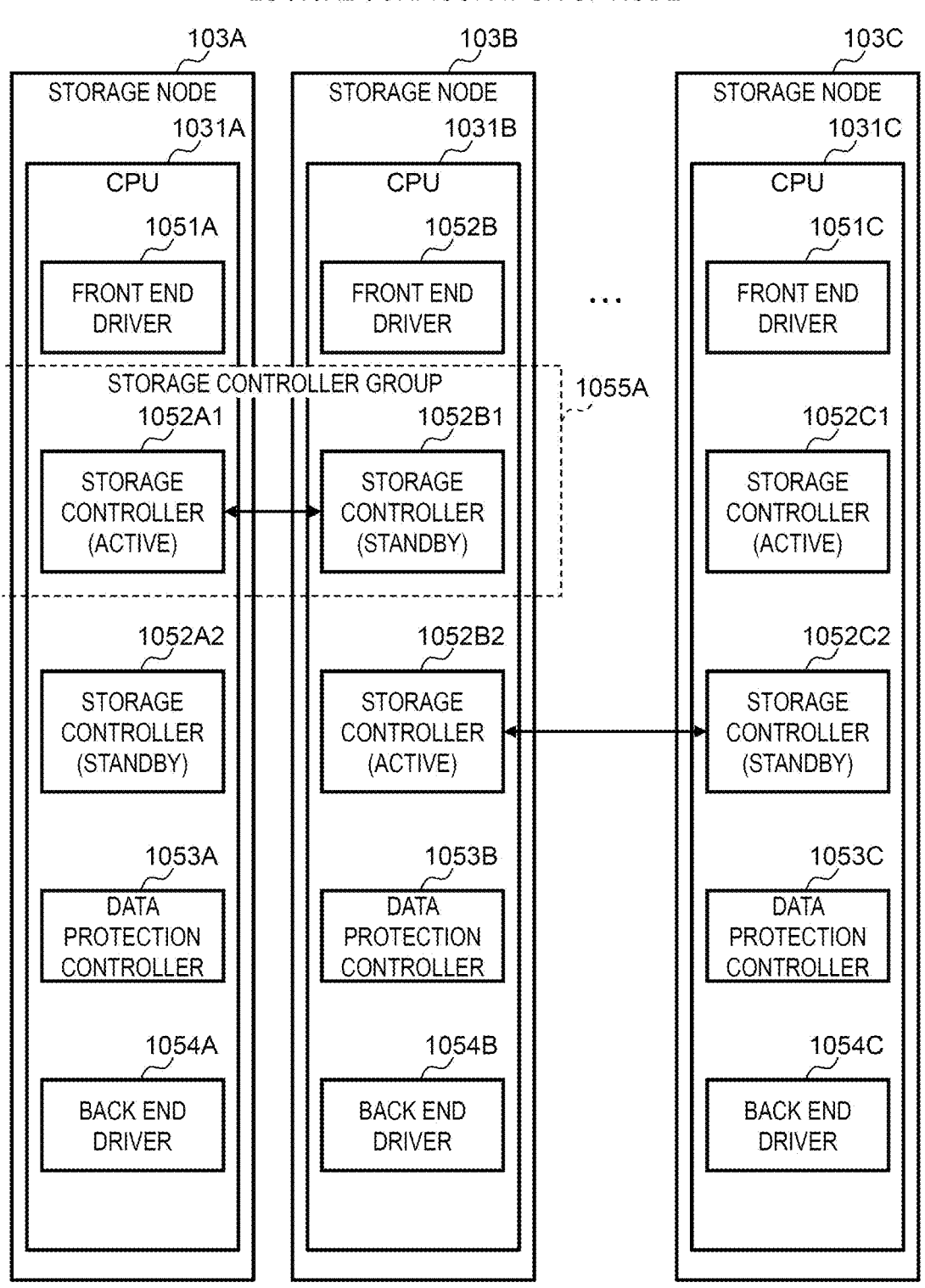
FIG. 3 is a diagram showing an example of a logical configuration of the storage node.

FIG. 3 is a diagram showing an example of a logical configuration of the storage node 103. The storage node 103 includes a front end driver 1051, one or more storage controllers 1052, a data protection controller 1053, and a back end driver 1054.

The front end driver 1051 is software having functions of controlling the NIC 1034 and providing the CPU 1031 with an abstracted interface for the storage controller 1052 when communicating with the host device 101, another storage node 103, or the management node 104.

The back end driver 1054 is software having functions of controlling each storage device 1033 in the own storage node 103 and providing the CPU 1031 with an abstraction interface when communicating with each storage device 1033.

The storage controller 1052 is software that functions as an SDS controller. The storage controller 1052 receives the I/O request from the host device 101 and issues an I/O command corresponding to the I/O request to the data protection controller 1053. The storage controller 1052 has a logical volume configuration function. The logical volume configuration function associates a logical chunk configured with the data protection controller 1053 with a logical volume provided to a host. The association may be, for example, a straight mapping (the logical chunks and the logical volumes are associated one to one, and an address of the logical chunk and an address of the logical volume are the same) method or a virtual volume function (thin provi-sioning) (the logical chunks and the logical volumes are divided into small-sized areas (pages) and the addresses of logical chunks and logical volumes are associated in page unit) method.

In Embodiment 1, a storage controller group 1055 is managed, in which the storage controller 1052 on a certain storage node 103 implements a redundant configuration together with one or more storage controllers 1052 on another storage node 103. In the storage controller group 1055, one storage controller 1052 is set to a state (active state and referred to as active) capable of receiving the I/O request from the host device 101. In the storage controller group 1055, the storage controller 1052 that is not active is set to a state (standby state and referred to as standby state) of not receiving the I/O request from the host device 101. In FIG. 3, for example, a storage controller 1052A1 on a storage node 103A is set to be active and a storage controller 1052B1 on a storage node 103B is set to be standby, thereby implementing a storage controller group 1055A.

In the storage controller group 1055, when a failure occurs in the storage node 103 in which the storage controller 1052 set to be active is provided, a state of the storage controller 1052 set to be standby until then is switched to active. Accordingly, when the storage controller 1052 set to be active becomes inoperable, the storage controller 1052 set to be standby can take over I/O processing executed by the storage controller 1052.

The data protection controller 1053 is software having functions of allocating the physical storage area provided by storage devices 1033 in its own storage node 103 or another storage node 103 to the storage controller group 1055 and reading or writing designated data from or to the corresponding storage device 1033 according to the I/O command provided by the storage controller 1052.

Figure 4:
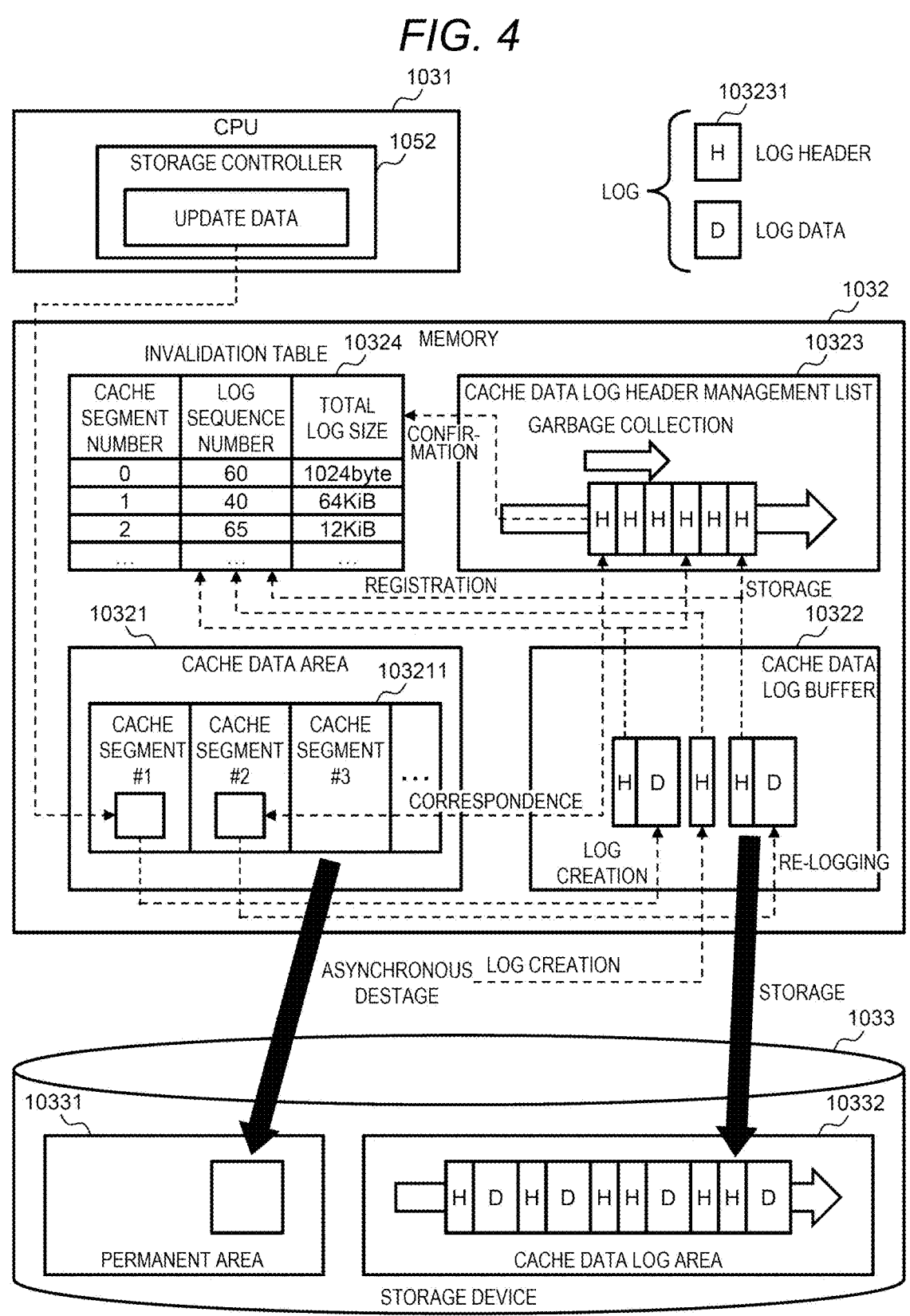
FIG. 4 is a diagram showing an outline of the storage system and a storage control method in the disclosure.

FIG. 4 is a diagram showing an outline of a storage system and a storage control method in the disclosure.

Figure 9:
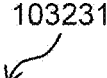
FIG. 9 is a diagram showing a structure of a log header.

The storage controller 1052 updates cache data for processing associated with the I/O request from the host device 101 or various other types of processing. At this time, the cache data in a cache data area 10321 of the memory 1032 is updated, a log is created in a cache data log buffer 10322, and the log is stored in a cache data log area 10332 in the storage device 1033 and is made non-volatile. The log is implemented by the updated cache data itself (log data) and a log header 103231, and is information indicating how the cache data in the memory is updated. As shown in FIG. 9, the log header 103231 includes information indicating an update address, an update size, and an order relationship between updates. In the case of an update in which the cache data is written to a permanent area 10331 and deleted from the cache data area 10321, such as asynchronous destage to be described later, the log may be implemented by only the log header 103231. Further, when the log is made non-volatile in the cache data log area 10332, the log header 103231 is stored in a cache data log header management list 10323 on the memory 1032.

To prevent confusion in the following description, a difference between destaging data and storing the log in the cache data log area will be clarified here. The destage refers to writing dirty data related to a cache to a permanent area in a storage device which is a final storage medium. The data is stored in the storage device with enhanced data protection, capacity efficiency, I/O performance, and the like by a storage function provided by a storage system (mainly a controller). For example, in the data protection, the data is protected by a method such as RAID6, and in this case, parity data is generated in destage processing and is also written to the drive. For data that has been destaged, the data related to the memory and the data related to the storage device are in a consistent state (clean), so there is no problem even when the data is lost from the memory.

The cache data area 10321 is divided into a plurality of cache segments 103211. Although the cache data is updated on the cache segment 103211, the asynchronous destage is performed when the data is not updated (dirty) in the permanent area 10331 on the storage device 1033. The asynchronous destage is an operation of writing data of the cache segment 103211 to the permanent area 10331 asynchronously with the I/O request.

The log on the cache data log buffer 10322 is written in the cache data log area 10332 on the storage device 1033 in a write-once format. This writing may be performed immediately or asynchronously.

Since write-once is performed, the free capacity in the cache data log area 10332 on each storage device 1033 gradually decreases, and writing becomes impossible. To avoid this, collection of empty areas is performed by a garbage collection method. After the garbage collection, a log for configuring a dirty image on the cache data area 10321 may remain in the cache data log area 10332. That is, a timing at which a certain log becomes unnecessary is when an update range on the cache data area 10321 by the log is completely overwritten or when the log is made non-volatile by asynchronous destage. Therefore, when the cache data area 10321 is divided into one or more areas, for each area, using the writing of the entire area or the asynchronous destage of the entire area as a reference, logs older than that in the update order are unnecessary logs, and newer logs after that in the update order are necessary logs. Therefore, when the log header 103231 is stored in the cache data log header management list 10323, update order information on the writing of the entire area or asynchronous destage of the entire area is registered in an invalidation table 10324 for each divided area. Then, at the time of garbage collection, a log newer than the update order described in the invalidation table 10324 is used as a necessary log for a log in a collection range of the cache data log header management list, and a log is created again (re-logged) from the corresponding location on the cache data area 10321. Accordingly, the necessary log remains in the cache data log area, and only the unnecessary log can be collected as the empty area of the cache data log area 10332.

These pieces of processing are operations of the storage controller 1052 which is set to be active and receives the I/O request. The storage controller 1052 set to be active creates a log and transmits the created log to the storage controller 1052 set to be standby. The storage controller 1052 set to be standby updates the cache data related to the cache data area 10321 of the memory 1032 based on the log received from the storage controller 1052 set to be active. The log received from the storage controller 1052 set to be active is stored in the cache data log buffer 10322, the log is stored in the cache data log area 10332 on the storage device 1033 and is made non-volatile, and the log header 103231 is stored in the cache data log header management list 10323 on the memory 1032. Accordingly, the update of the cache data is made redundant to the storage node 103 in which the storage controller 1052 set to be standby is provided.

Since not only the log of cache data updates but also the log resulting from asynchronous destage is made redundant, the garbage collection using the invalidation table 10324 is possible even after the storage controller 1052 set to be standby takes over the I/O processing. Further, in the garbage collection, since a log is created by re-logging, this log is also made redundant. Therefore, the garbage collection may be performed only by the storage controller 1052 set to be active. A specific example of the processing will be described with reference to FIG. 4.

Example of Updating by Writing

The storage controller 1052 writes update data to a cache segment 103211 #1.

The storage controller 1052 creates a log in the cache data log buffer 10322 on the memory 1032. The log includes cache data and a log header.

The storage controller 1052 stores the log (the cache data and the log header) of the cache data log buffer 10322 in the cache data log area 10332 of the storage device 1033 and makes the log non-volatile.

Following the non-volatilization, the storage controller 1052 registers the log header in the cache data log header management list 10323.

If it is a log for updating the entire cache segment 103211#1, the storage controller 1052 updates a sequence number of the log of the cache segment 103211#1 in the invalidation table 10324. Logs performed on the cache segment 103211#1 having sequence numbers smaller than the sequence number are unnecessary logs. The storage controller 1052 resets a total log size of the cache segment 103211#1.

If it is a log for updating a part of the cache segment 103211#1, the storage controller 1052 adds the log data to the total log size of the logs of the cache segment 103211#1 in the invalidation table 10324.

Example of Destage

The storage 1052 stores a cache segment 103211#3 in the permanent area 10331 of the storage device 1033.

The storage controller 1052 creates a destage log in the cache data log buffer 10322 on the memory 1032. The destage log does not include the cache data and only includes the log header.

The storage controller 1052 stores the log (the log header) of the cache data log buffer 10322 in the cache data log area 10332 of the storage device 1033 and makes the destage log non-volatile.

When the destage is performed, since data becomes unnecessary in cache segment units, there is no need to register the data in the cache data log header management list 10323.

The storage controller 1052 updates a sequence number of the log of the cache segment 103211#3 in the invalidation table 10324. Logs performed on the cache segment 103211#3 having sequence numbers before the sequence number are unnecessary logs. The storage controller 1052 resets a total log size of the cache segment 103211#2.

Example of Garbage Collection

The storage controller 1052 refers to the log header registered in the cache data log header management list 10323 in order from the oldest and determines whether it is necessary to perform re-logging. If the address of the log header indicates an update to the cache segment #2, the storage controller 1052 compares the log sequence number associated with the cache segment #2 in the invalidation table 10324 with the log sequence number in the log header. If the log sequence number of the log header is older, it is not necessary to perform re-logging. If the log sequence number of the log header is newer, the storage controller 1052 performs re-logging. In the re-logging, the storage controller 1052 reads the update data from the cache segment #2 and creates a log in the cache data log buffer 10322 on the memory 1032. The log includes cache data and a log header. That is, the log is created again based on the log header read from the cache data log header management list 10323.

The storage controller 1052 stores the log (the cache data and the log header) of the cache data log buffer 10322 in the cache data log area 10332 of the storage device 1033 and makes the log non-volatile.

Following the non-volatilization, the storage controller 1052 registers the log header in the cache data log header management list 10323.

If it is a log for updating the entire cache segment 103211#2, the storage controller 1052 updates a sequence number of the log of the cache segment 103211#2 in the invalidation table 10324. Logs performed on the cache segment 103211#2 having sequence numbers smaller than the sequence number are unnecessary logs. The storage controller 1052 resets a total log size of the cache segment 103211#2.

If it is a log for updating a part of the cache segment 103211#2, the storage controller 1052 adds a size of log data to the total log size of the logs of the cache segment 103211#2 in the invalidation table 10324.

In this way, old logs become unnecessary by selectively re-logging a necessary log. The storage controller 1052 releases the unnecessary area in the cache data log area 10332 of the storage device 1033 and collects the empty area.

Figure 5:
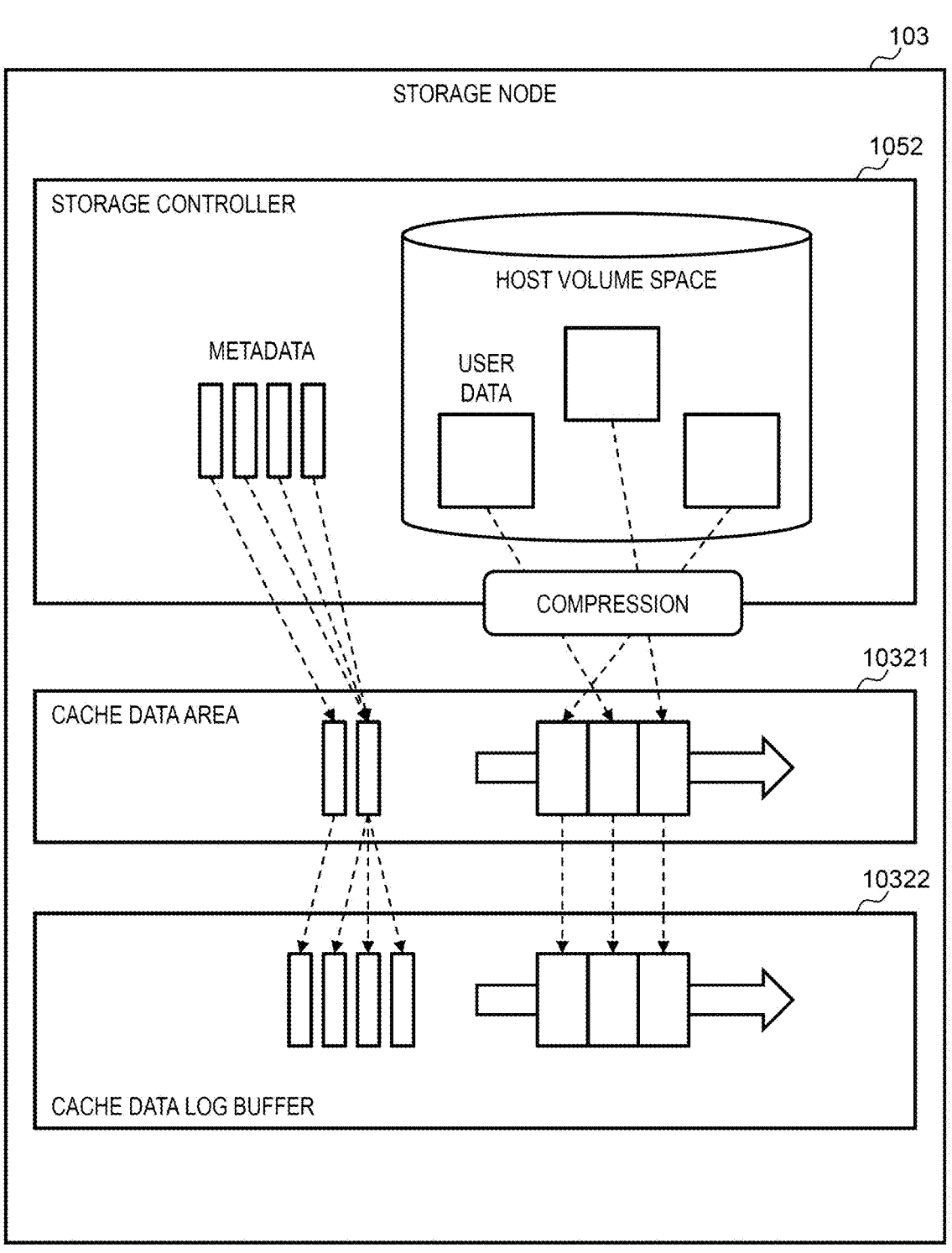
FIG. 5 is a diagram showing an outline of a compression function.

FIG. 5 is a diagram showing an outline of a compression function. The compression function is an example of various functions supported by the storage controller 1052. The compression function is a function capable of compressing user data received from the host device 101 to a host volume space by a data compression algorithm and storing it in the cache data area 10321 and the storage device 1033 to reduce capacity consumption, save the capacity of the storage device 1033, and reduce the cost of the storage device 1033.

The data received from the host device 101 into the host volume space is stored in the cache data area 10321. The processing at this time is different from write processing 401 shown in FIG. 12 in that the data to be written in the cache data area 10321 is compressed and the write of the compressed data and metadata indicating a position of the compressed data are performed.

At this time, for example, even when the user data is written at random in the host volume space, the compressed data is written in the cache data area 10321 in a write-once format. This is because, in the compression function, the size of the data received from the host device 101 after compression is indefinite, and the old data and the compressed data may not be replaced because they have different sizes.

In the cache data area 10321, the metadata is written by the storage controller 1052. The metadata includes, for example, information indicating a position of the user data in the host volume space, a position of the compressed data in the cache data area 10321, and a correspondence relationship between the positions on the storage device 1033 and empty area information of an area for the compressed data related to the cache data area 10321 when the additional writing of the compressed data is performed. Therefore, the metadata is written in the cache data area 10321 for each I/O and is characterized by a small size and frequent overwriting.

Figure 6:
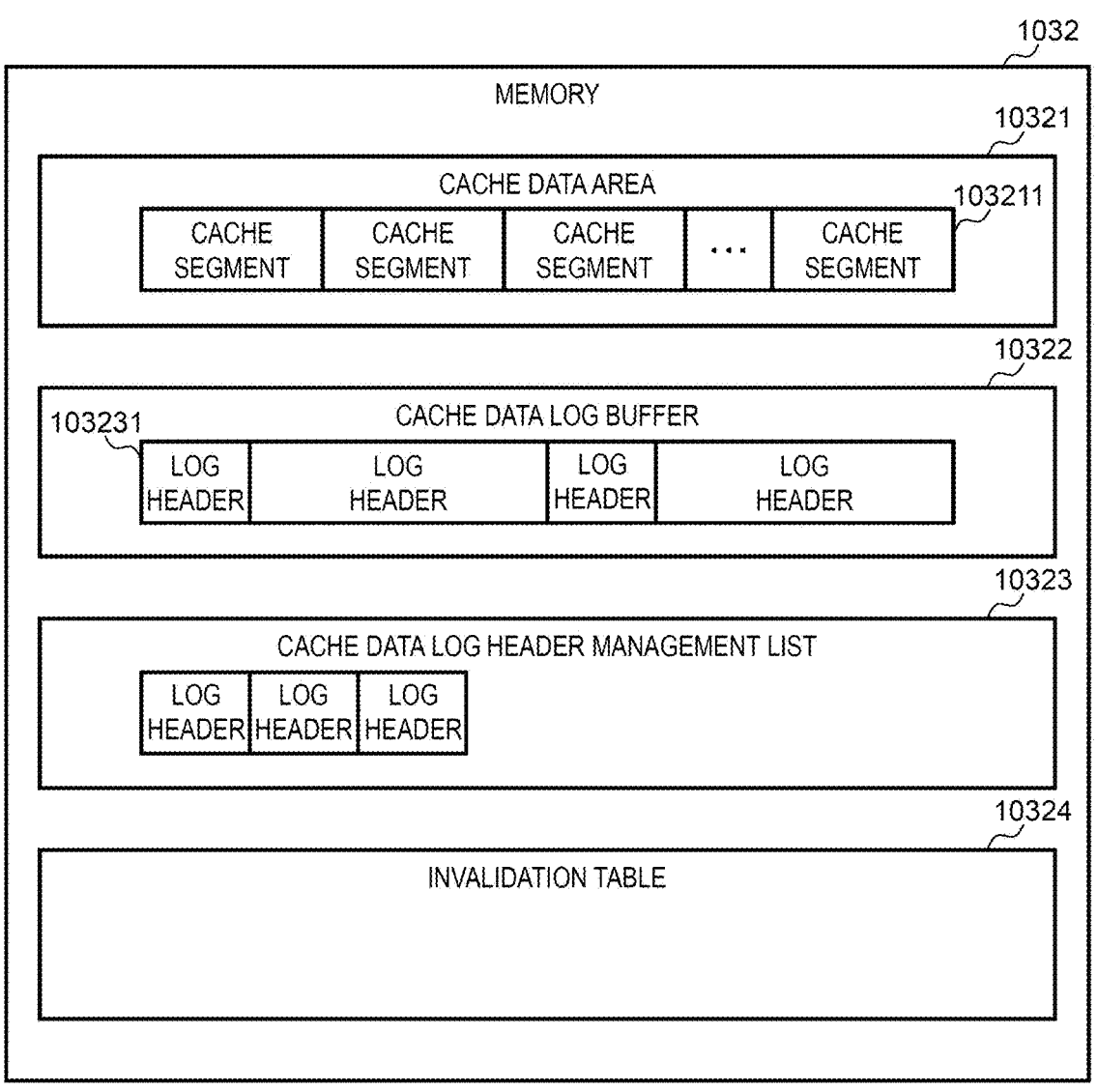
FIG. 6 is a diagram showing an example of a configuration diagram of a memory.

FIG. 6 is a diagram showing an example of a configuration diagram of the memory 1032. The memory 1032 includes the cache data area 10321, the cache data log buffer 10322, the cache data log header management list 10323, and the invalidation table 10324. The cache data log buffer 10322 temporarily stores the log of the cache data. The cache data log header management list 10323 stores the log headers 103231 of all cache data logs on the disk.

Figure 7:
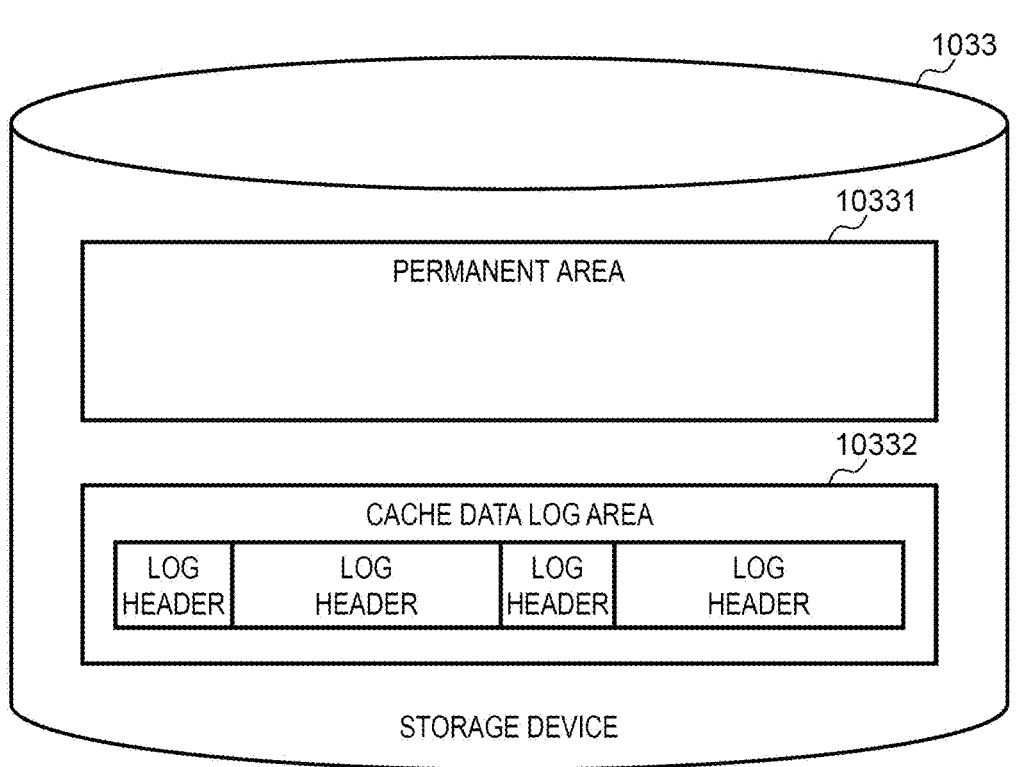
FIG. 7 is a diagram showing an example of a configuration diagram of a storage device.

FIG. 7 is a diagram showing an example of a configuration diagram of the storage device 1033. The storage device 1033 includes the permanent area 10331 and the cache data log area 10332. The permanent area 10331 is an area for storing the user data managed by the data protection controller 1053. The cache data log area 10332 is an area of a destination to which the log is saved in log saving processing to be described later.

Figure 8:
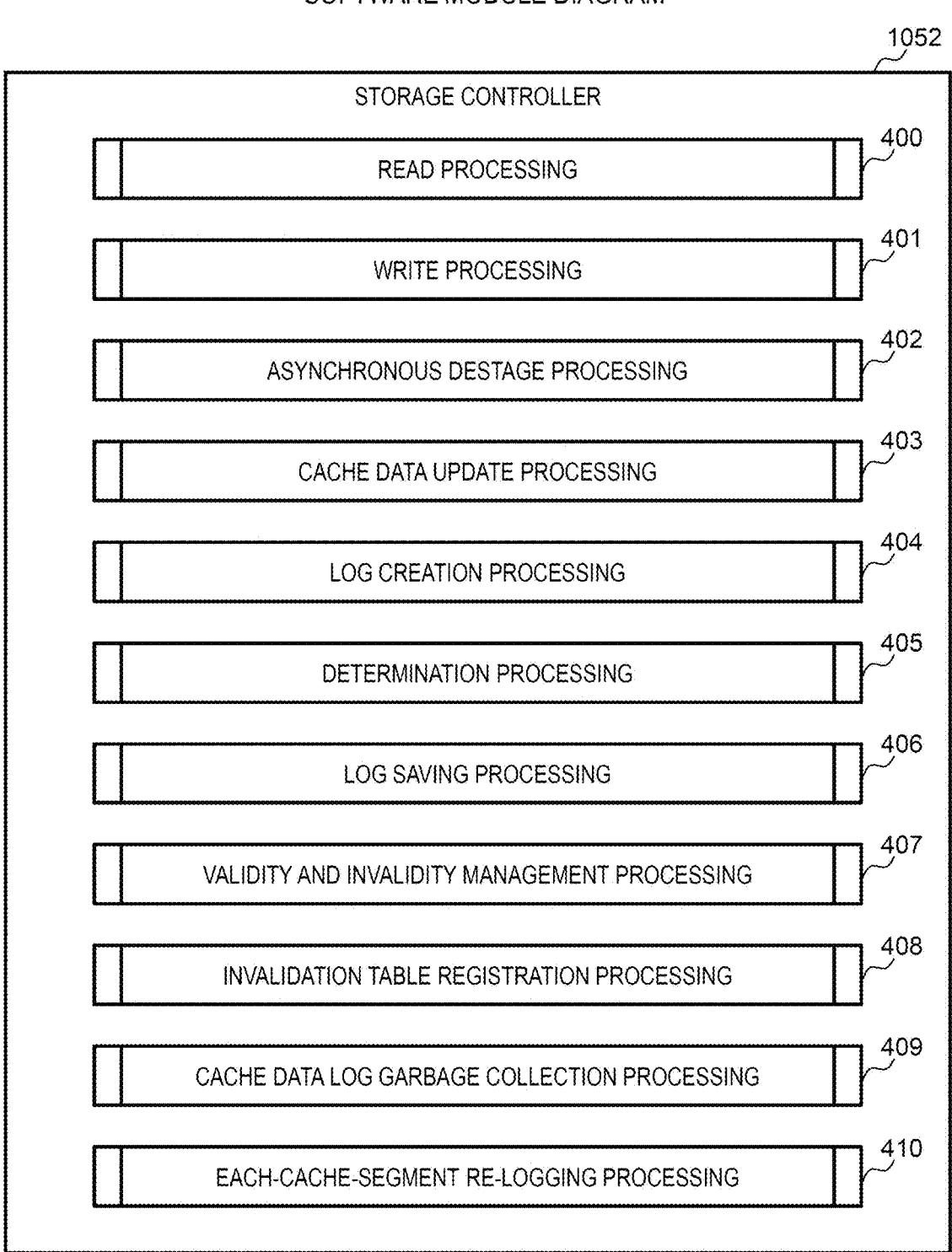
FIG. 8 is a diagram showing an example of a software module structure of a storage controller.

FIG. 8 is a diagram showing an example of a software module structure of the storage controller 1052. The storage controller 1052 executes read processing 400, the write processing 401, asynchronous destage processing 402, cache data update processing 403, log creation processing 404, determination processing 405, log saving processing 406, validity and invalidity management processing 407, invalidation table registration processing 408, cache data log garbage collection processing 409, and each-cache-segment re-logging processing 410. Each piece of processing will be described later in detail.

FIG. 9 is a diagram showing a structure of the log header 103231. The log header is a table included in each log stored in the cache data log buffer 10322 and the cache data log header management list 10323 on the memory 1032 and the cache data log area 10332 on the storage device 1033. Each log header 103231 includes fields of a log sequence number, an update address, an update size, and a log type.

The log sequence number field stores a log sequence number uniquely assigned to each log. The update address field stores an address of a cache data area to be updated by each log. The update size field stores a size of the cache data to be updated by each log. The log type field stores a value (log type) for identifying what kind of log is created at the time of log creation. The log type includes, for example, a cache data log associated with the write processing 401 and a destage log associated with the asynchronous destage processing 402. The log type field may store a character string such as a "cache data log" or a "destage log", or may store a numerical value such as "1" or "2".

Figure 10:
FIG. 10 is a diagram showing a structure of an invalidation table.

FIG. 10 is a diagram showing a structure of the invalidation table 10324. The invalidation table is a table in which the cache segment number for identifying the cache segment 103211 is associated with the log sequence number of the log created in accordance with the write processing 401 on the entire cache segment 103211 or the asynchronous destage processing 402 on the cache segment 103211 and a sum of update sizes (total log size) of the cache data logs for the cache segment 103211 after that log.

Figure 11:
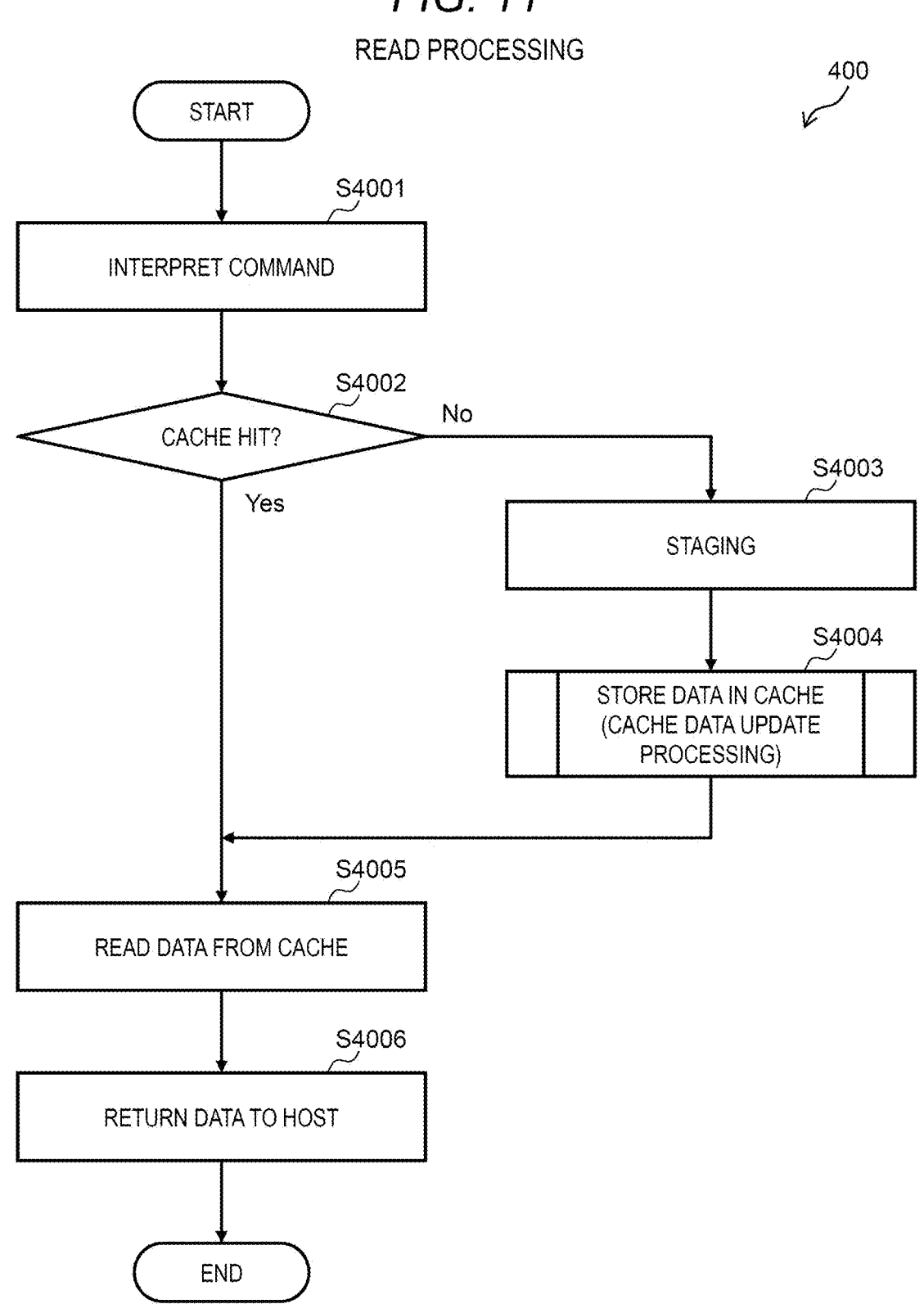
FIG. 11 is a flowchart of read processing.

FIG. 11 is an example of a flowchart of the read processing 400. The read processing 400 is called when a read I/O request is received from the host device 101 and is executed by the storage controller 1052. First, the read I/O request transmitted by the host device 101 is received via the front end driver, and the read I/O request is interpreted to obtain a logical volume number and logical volume address of a read target (step 4001). Subsequently, it is determined whether the cache data corresponding to the logical volume number and the logical volume address is in the cache data area 10321 (cache hit) (step 4002). In the case of a cache hit (Yes in step 4002), the data is read from the cache data area 10321 (step 4005), and the data is returned to the host (step 4006).

In the case of a cache miss (No in step 4002), staging processing is called (step 4003). The staging processing is processing executed by the data protection controller 1053 and reads the data corresponding to the logical volume number and the logical volume address from the permanent area 10331 on the storage device 1033. The read data is stored in the cache data area 10321 on the memory 1032 (step 4004). At this time, the cache data update processing 403 to be described later is called by setting non-volatilization necessity as "unnecessary". Then, as in the case of a cache hit, the data is read from the cache data area 10321 (step 4005), and the data is returned to the host device 101 (step 4006).

Figure 12:
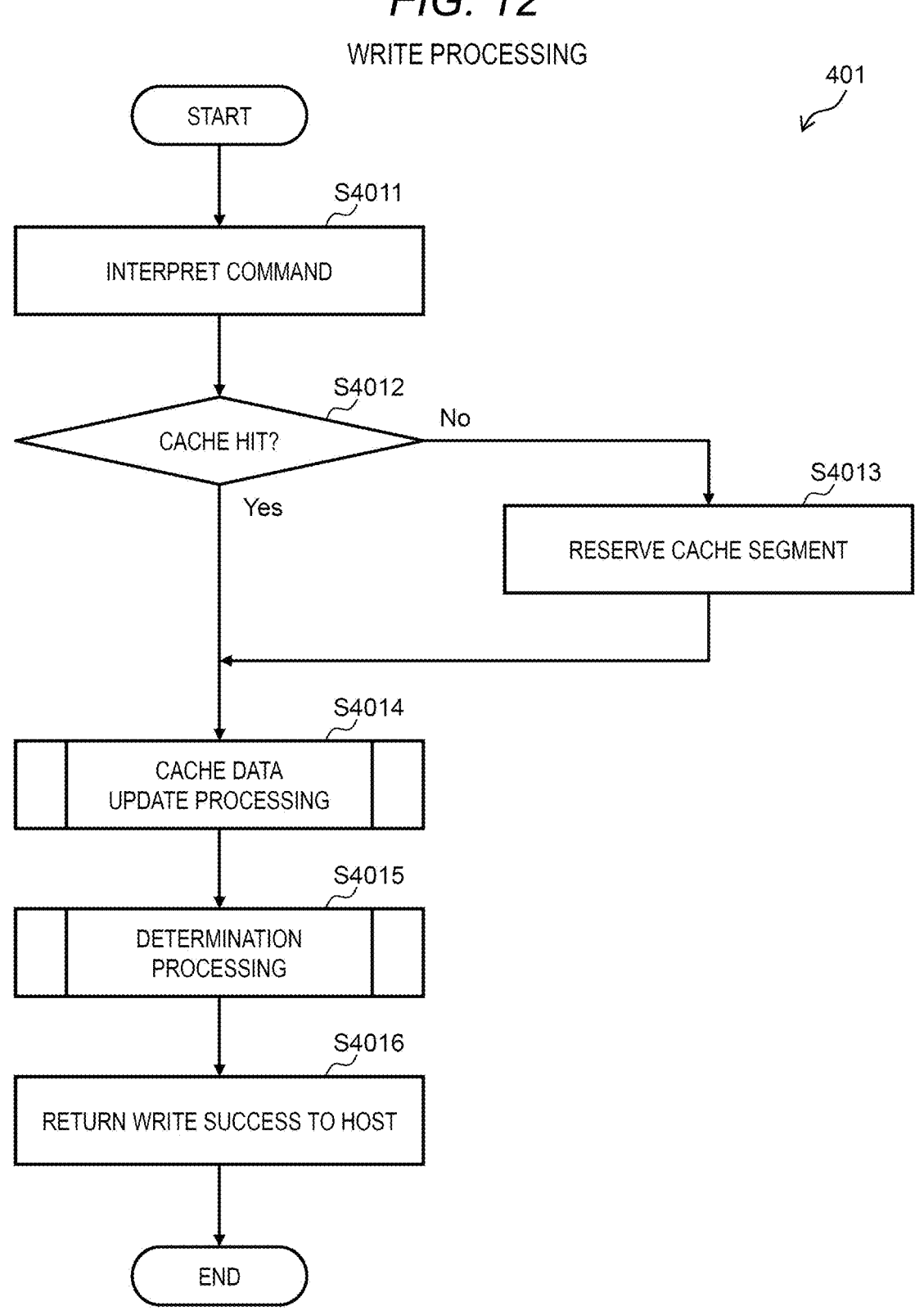
FIG. 12 is a flowchart of write processing.

FIG. 12 is an example of a flowchart of the write processing 401. The write processing 401 is called when a write I/O request is received from the host device 101 and is executed by the storage controller 1052. First, the write I/O request transmitted by the host device 101 is received via the front end driver, and the write I/O request is interpreted to obtain a logical volume number and logical volume address of a write target (step 4011). Subsequently, it is determined whether the cache data corresponding to the logical volume number and the logical volume address is in the cache data area 10321 (cache hit) (step 4012). In the case of a cache hit (Yes in step 4012), the data is stored in the cache data area 10321 (step 4014). At this time, the cache data update processing 403 to be described later is called by setting the non-volatilization necessity as "necessary". Subsequently, determination processing to be described later is called (step 4015). Then, a write success is returned to the host device 101 (step 4016). In the case of a cache miss (No in step 4012), the cache segment 103211 is reserved (4013). Then, the processing proceeds to step 4014, and thereafter, the same processing as in the case of a cache hit is performed.

Figure 13:
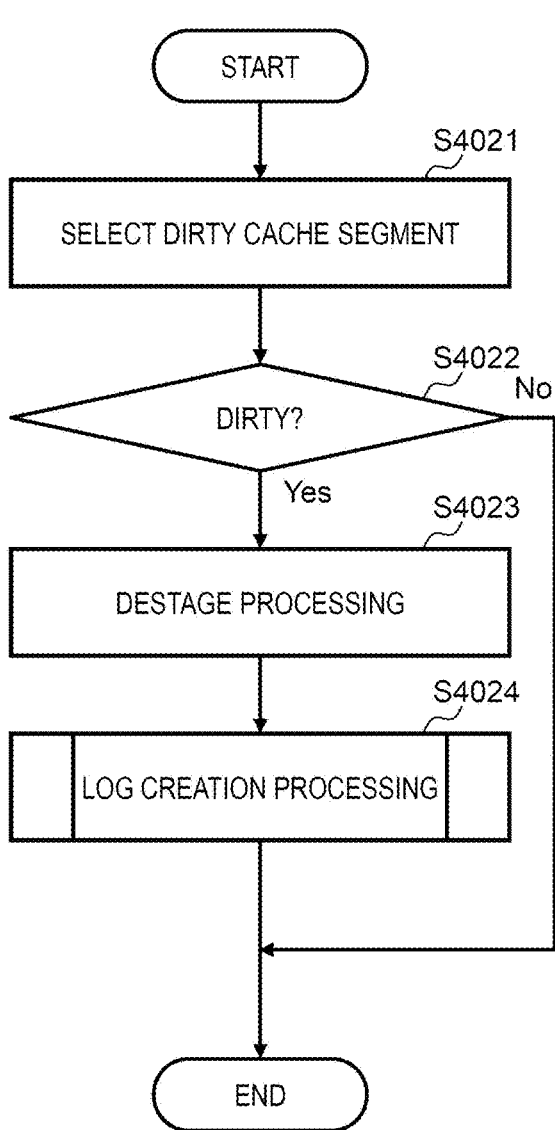
FIG. 13 is a flowchart of asynchronous destage process-ing.

FIG. 13 is an example of a flowchart of the asynchronous destage processing 402. First, the dirty cache segment 103211 is searched for (step 4021), and if there is no such cache segment 103211 (No in step 4022), the processing ends. If there is a dirty cache segment (Yes in step 4022), the destage processing is executed on the cache segment 103211 as a target (step 4023). The destage processing is processing executed by the storage controller 1052 and the data protection controller 1053 and writes data corresponding to the logical volume number and the logical volume address to the permanent area 10331 on the storage device 1033. Then, the log creation processing 404 is called (step 4024).

FIG. 14 is a flowchart of the cache data update processing 403. The cache data update processing 403 is called when updating the cache data related to the memory 1032. When called, information indicating a memory address for specifying cache data which is an update target, a size, an update value, and a non-volatilization necessity is transmitted.

First, the cache data related to the memory 1032 is updated (step 4031). Subsequently, it is determined whether it is necessary to perform non-volatilization referring to the transmitted non-volatilization necessity (step 4032). If necessary (Yes in step 4032), the log creation processing 404 is called (step 4033).

Figure 15:
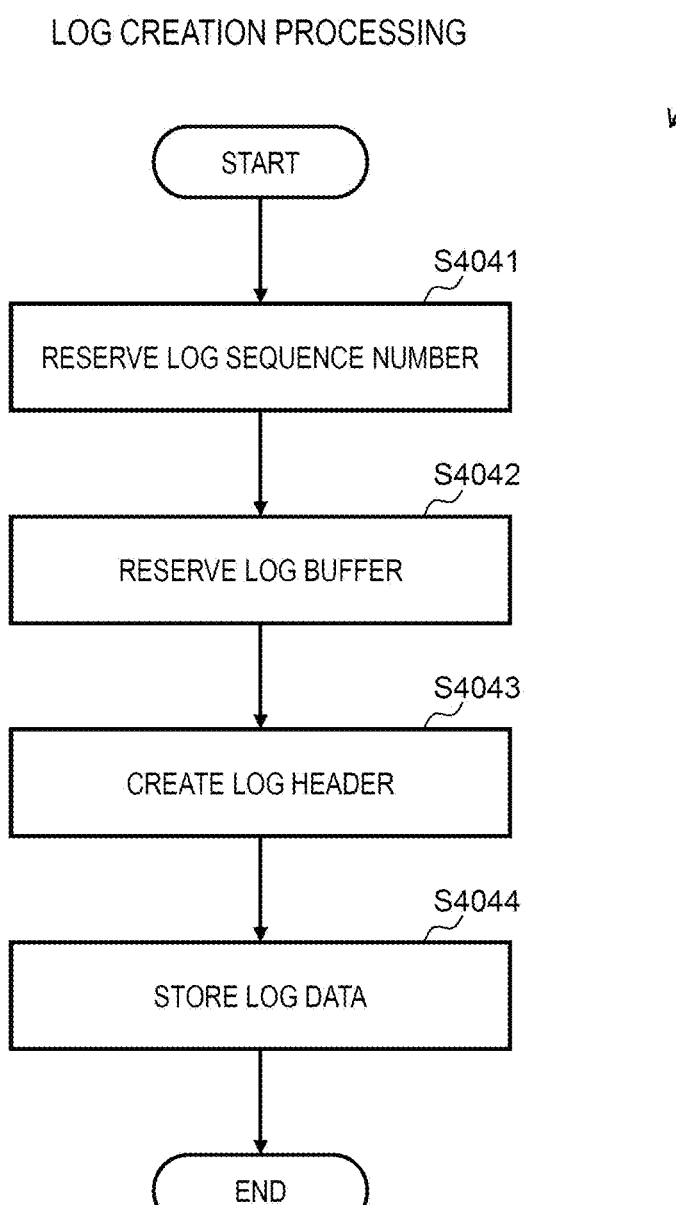
FIG. 15 is a flowchart of log creation processing.

FIG. 15 is a flowchart of the log creation processing 404. First, a log sequence number is determined (step 4041). The log sequence number is assigned in the order of creation of the logs and is a number such that one log always corresponds to one log sequence number. Subsequently, an area into which the log is written is reserved in the cache data log buffer 10322 (step 4042). Subsequently, the log header 103231 is created (step 4043). The above-described log sequence number is stored in the sequence number field of the log header, the memory address for specifying the cache data which is an update target is stored in the update address field, and the size of the cache data which is an update target is stored in the update size field. The log type field stores a "cache data log" when called from the cache data update processing 403 and stores a "destage log" when called from the asynchronous destage processing 402.

Then, the log is stored in the cache data log buffer 10322 (step 4044). Specifically, the log header is stored at the beginning of an area reserved in step 4042 on the cache data log buffer 10322, and the cache data updated to a memory address obtained by adding the size of the log header 103231 is stored in the reserved area.

Figure 16:
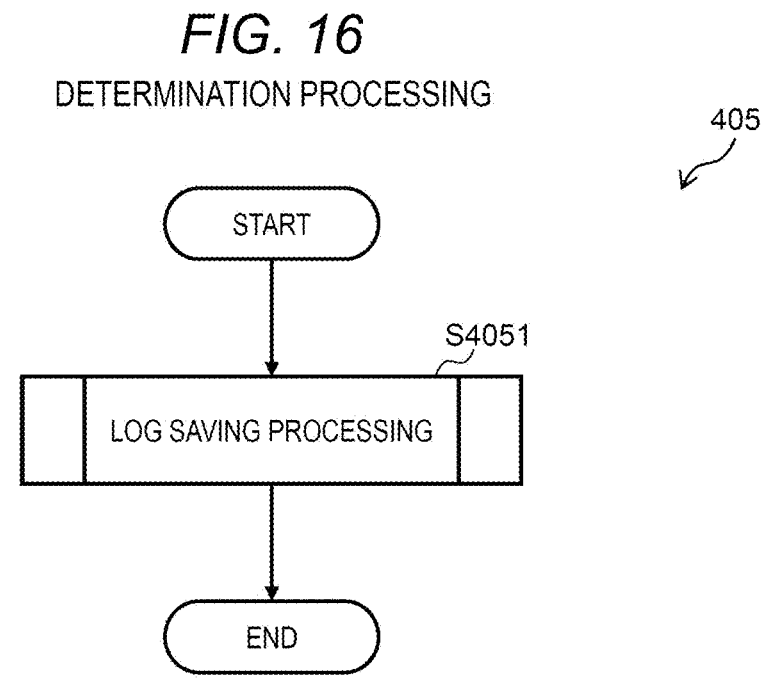

FIG. 16 is a flowchart of the determination processing 405. The determination processing 405 only calls the log saving processing 406 (step 4051).

Figure 17:
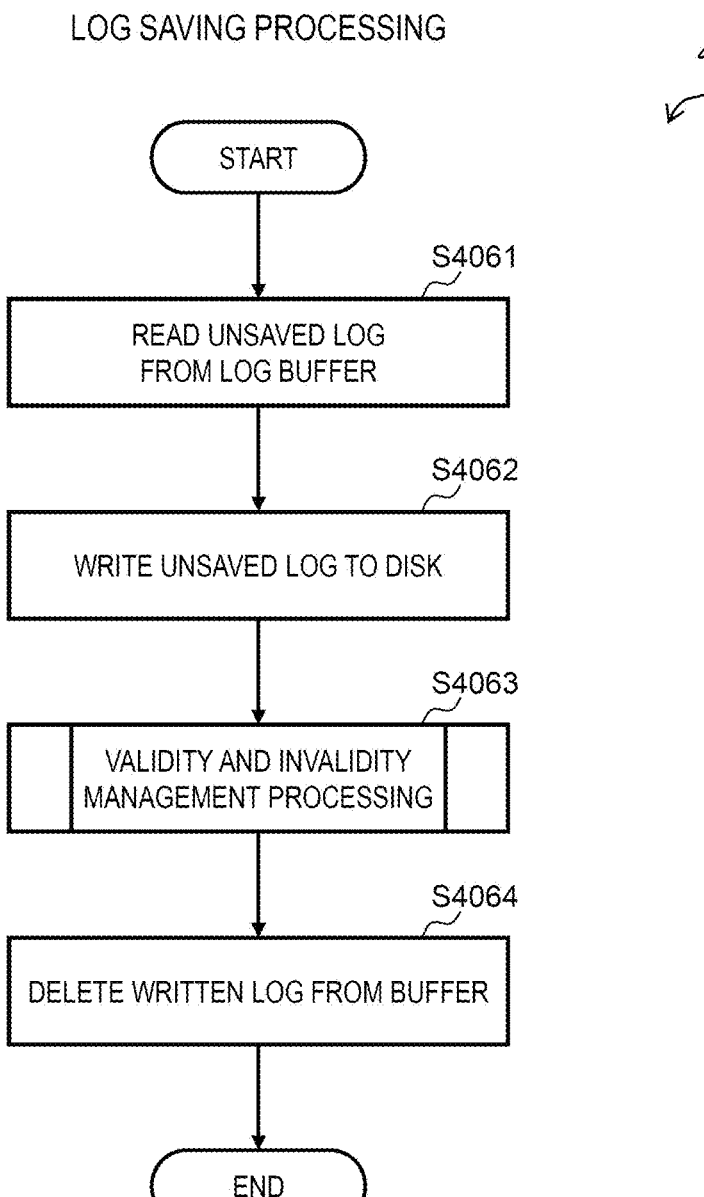
FIG. 17 is a flowchart of log saving processing.

FIG. 17 is a flowchart of the log saving processing 406. First, referring to the cache data log buffer 10322, an unsaved log is read (step 4061). Subsequently, the unsaved log is stored in the cache data log area 10332 on the storage device 1033 (step 4062). The storage position is immediately after the last written log. Subsequently, the validity and invalidity management processing 407 to be described later is called (step 4063). Then, the log stored in the cache data log area 10332 is deleted from the cache data log buffer 10322 (step 4064).

FIG. 18 is a flowchart of the validity and invalidity management processing 407. First, referring to the cache data log buffer 10322, the log header 103231 of a log which is a saving target in the log saving processing 406 is read, and a log type thereof is confirmed (step 4071). If the log type is a cache data log (Yes in step 4072), the log header 103231 is stored in the cache data log header management list 10323 (step 4073). The storage position is immediately after the last stored log header 103231. Then, following step 4073, if the log type is a destage log (No in step 4072), the invalidation table registration processing 408 is called (step 4074). In the invalidation table registration processing 408, the log header 103231 is transmitted.

Figure 19:
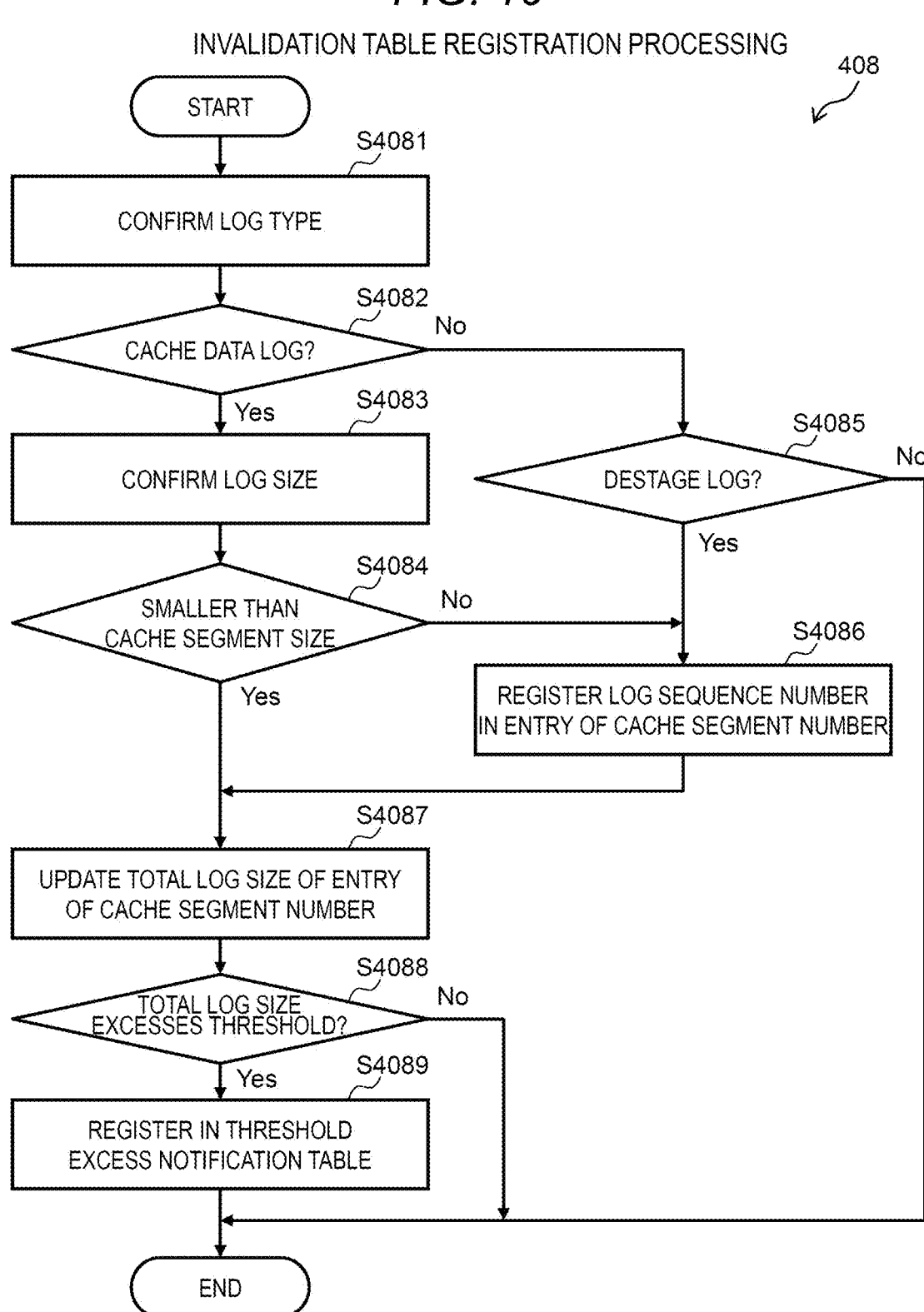
FIG. 19 is a flowchart of invalidation table registration processing.

FIG. 19 is a flowchart of the invalidation table registration processing 408. First, referring to the log header 103231 transmitted from the validity and invalidity management processing 407, the log type is confirmed (step 4081). If the log type is a cache data log (Yes in step 4082), referring to the log header 103231 transmitted from the validity and invalidity management processing 407, a log size thereof is confirmed (step 4083). If the log size is smaller than the size of the cache segment 103211 (Yes in step 4084), the total log size of the entries in the invalidation table 10324 corresponding to the cache segment number calculated from the memory address is updated by adding the log size (step 4087). If the total log size of the entry exceeds a threshold set in advance (Yes in step 4088), it is registered in a threshold excess notification table (step 4089). The threshold excess notification table is a list of the cache segments 103211 in which it is necessary to perform re-logging for each cache segment for creating a log of a cache segment size in the each-cache-segment re-logging processing 410 to be described later. In the threshold excess notification table, for example, the cache segment number of the relevant cache segment 103211 is registered.

If the log type is not a cache data log (No in step 4082), it is confirmed whether the log type is a destage log (step 4085). In the case of a destage log (Yes in step 4085), the log sequence number of the log is registered in the log sequence number field of the entry of the invalidation table 10324 corresponding to the cache segment number calculated from the memory address (step 4086). Subsequently, the total log size of the entries in the invalidation table 10324 is updated (step 4087). Here, since the log is a destage log, the total log size is set to "0". Then, the same processing is performed after step 4088.

When the log size is equal to or larger than the size of the cache segment 103211 (No in step 4084), the processing after step 4086 is performed. Here, since the log type is the cache data log, the log size is added to the total log size (step 4087).

Figure 20:
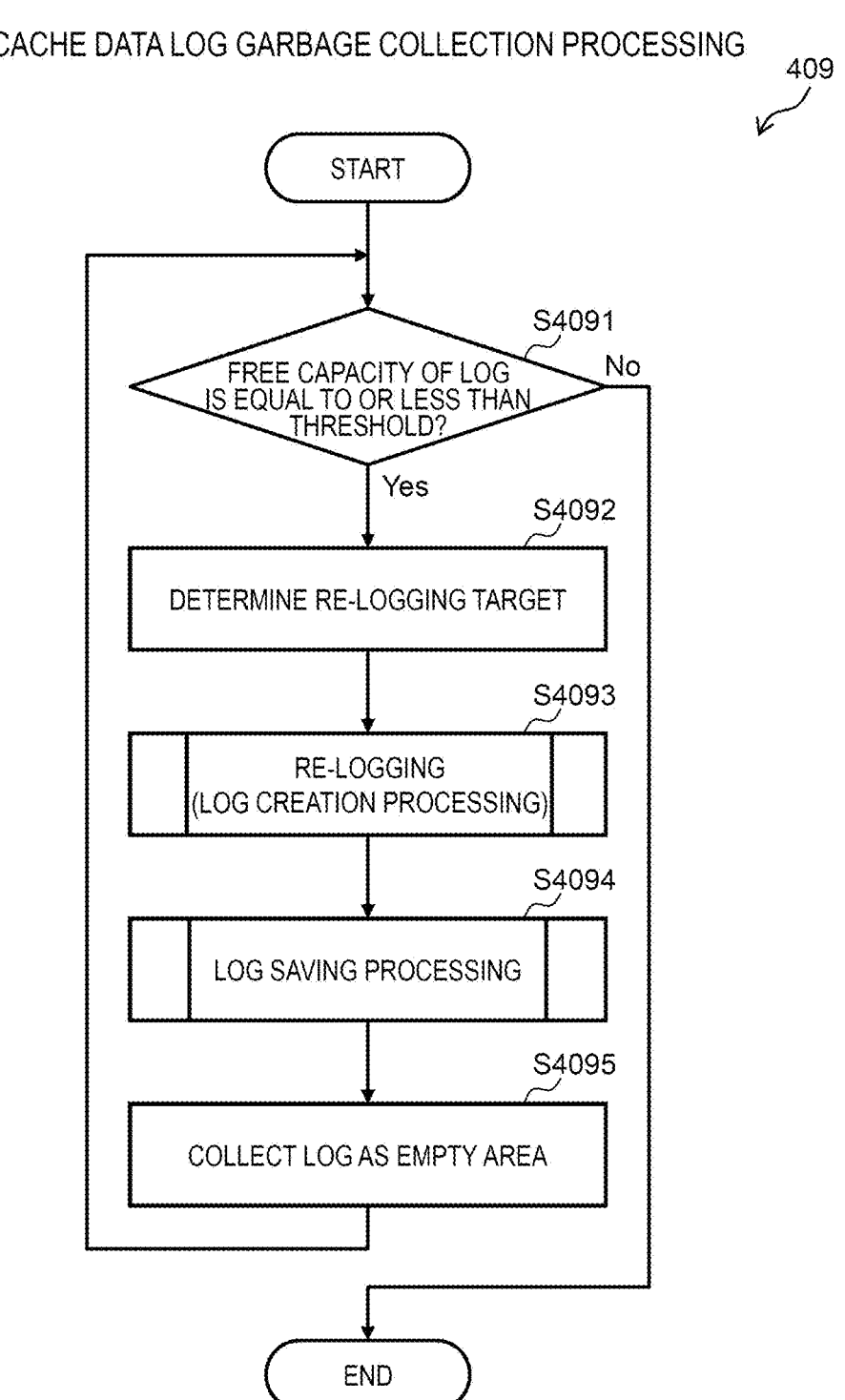
FIG. 20 is a flowchart of cache data log garbage collection processing.

FIG. 20 is a flowchart of the cache data log garbage collection processing 409. First, it is determined whether the empty area of the cache data log area 10332 is equal to or smaller than a threshold (step 4091). If it is not equal to or smaller than the threshold (No in step 4091), the processing ends without doing anything. If it is equal to or smaller than the threshold (Yes in step 4091), referring to the cache data log header management list 10323 on the memory 1032, the log header 103231 is searched for in a forward direction from the oldest one (the one having the lowest log sequence number) among the log headers 103231. The log sequence number of the searched log header 103231 is compared with the log sequence number of the entry of the invalidation table 10324 corresponding to the cache segment number calculated from the memory address of the log header. If the log sequence number of the searched log header 103231 is newer, the log is determined as a re-logging target log (step 4092). Subsequently, a log of data indicated by the log is newly created (re-logged) (step 4093). The re-logging is processing of creating a log by using data in a designated range on the memory as the log data instead of the updated cache data. Subsequently, when the log saving processing is called and the log is written in the cache data log area 10332 on the storage device 1033 (step 4094), an area having an address smaller than that of the re-logging target log including the re-logging target log on the cache data log area 10332 is collected as the empty area (step 4095).

Figure 21:
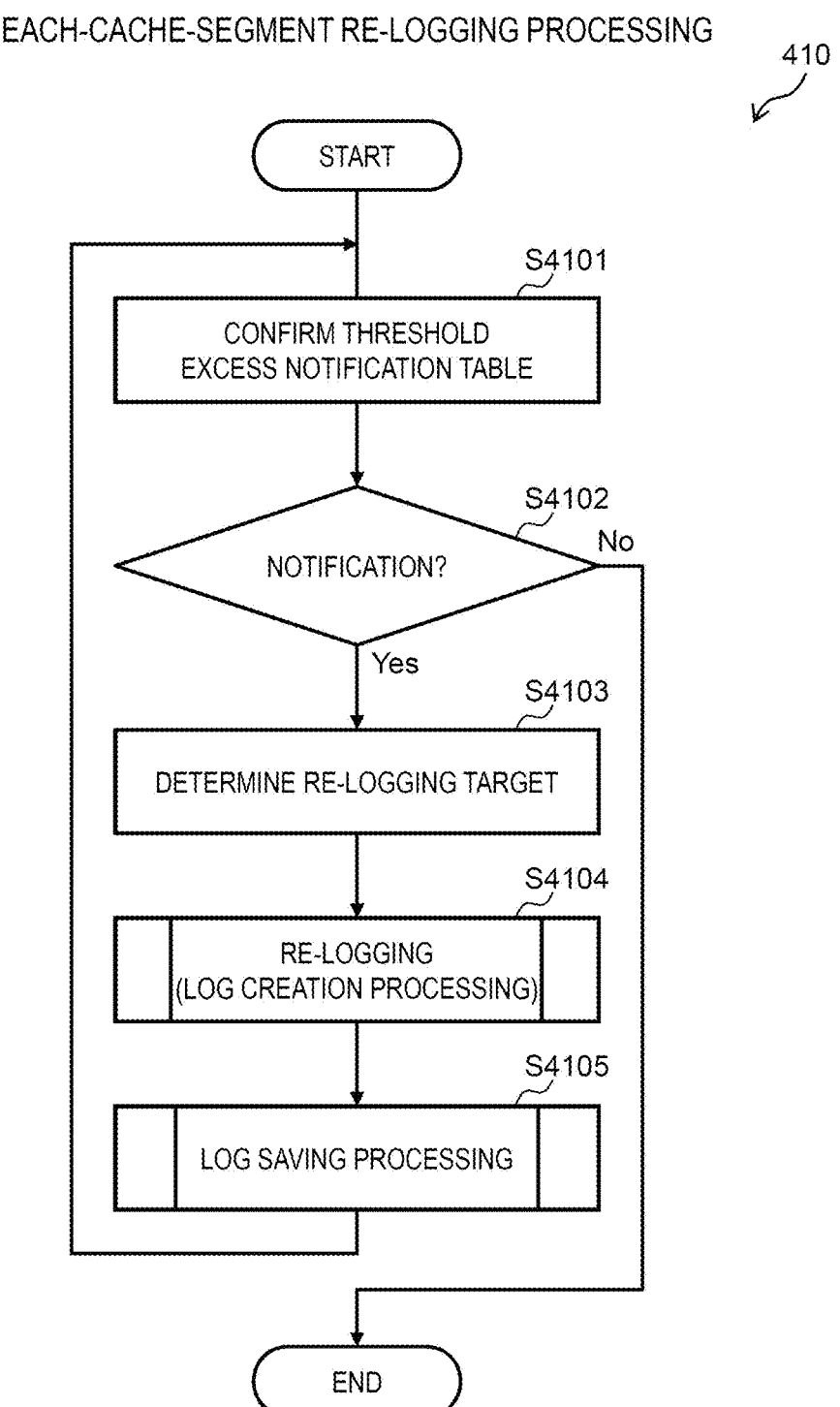
FIG. 21 is a flowchart of each-cache-segment re-logging processing.

FIG. 21 is a flowchart of the each-cache-segment re-logging processing 410. First, the threshold excess notification table is confirmed (step 4101), and it is determined whether there is a notification in the threshold excess notification table (step 4102). If there is no notification in the threshold excess notification table (No in step 4102), the processing ends without doing anything. If there is a notification in the threshold excess notification table (Yes in step 4102), one of the re-log target cache segments 103211 is taken out from the threshold excess notification table and is determined as a re-logging target (step 4103). Subsequently, a log is newly created by using the entire cache segment as the cache data of the log (step 4104). Then, the log saving processing is called, and the log is written in the cache data log area 10332 on the storage device 1033 (step 4105).

In this way, the write processing (FIG. 12) calls the invalidation table registration processing (FIG. 19) via the log saving processing (FIG. 17) and the validity and invalidity management processing (FIG. 18) and updates the invalidation table 10324.

Then, the cache data log garbage collection processing (FIG. 20) refers to the invalidation table 10324 in the processing of determining the re-logging target (step 4092).

The each-cache-segment re-logging processing (FIG. 21) prevents enlargement of the log data by creating a new log of cache data from the entire cache segment whose total log size indicated in the invalidation table 10324 exceeds the threshold.

In the present embodiment, there is no need to perform an operation of searching whether there is a cache data log having the same address for each write processing or searching whether there is a cache data log in the same address range as the destaged data for each asynchronous destage processing. Since the only operation required is to register the data in the invalidation table, overhead is low and performance is improved.

In the present embodiment, since the table is updated at the time of the asynchronous destage processing or when the cache data having the cache segment size is updated, many logs are not required to be re-logged, and write amplification (WA) is small by cache data log garbage collection processing in a workload having many random write I/O requests and many asynchronous destages or a workload having many sequential write I/O requests. Here, WA refers to a ratio of writing to the cache data log area including the re-logging to writing to the cache data log area according to the write I/O request. On the other hand, in a workload having many cache hits and few asynchronous destages or a workload having a relatively small log size, unnecessary re-logging may be increased, such as re-logging being performed even though the cache data area 10321 is already not the latest. However, by performing each-cache-segment re-logging before re-logging by the cache data log garbage collection, the WA and overheads can be reduced compared to re-logging by the cache data log garbage collection, improving performance.

Embodiment 2

Next, Embodiment 2 will be described. The present embodiment differs from Embodiment 1 in that an invalidation table has a granularity of minimum update unit. Accordingly, overheads are higher than those in Embodiment 1, and because whether overwrite occurs can be reliably determined, there are three differences including (1) the log sequence number field in the invalidation table is always registered even when an update, (2) each-cache-segment re-logging is no longer necessary, and (3) there is no need to record the log size because each-cache-segment re-logging is no longer necessary.

Figure 22:
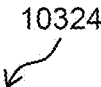
FIG. 22 is a diagram showing a structure of an invalida-tion table according to Embodiment 2.

FIG. 22 is a diagram showing a structure of the invalidation table 10324 according to Embodiment 2. The invalidation table is a table in which a cache block number is associated with a log sequence number of a log created in association with the write processing 401 or asynchronous destage processing 402 to that cache block. The cache data area 10321 is divided into cache blocks which are units smaller than the cache segment 103211. The cache block is a minimum unit of size for a write I/O request, and therefore, is also a minimum unit of size for a log update. A difference from FIG. 10 is that there is no total log size. The reason why there is no total log size is that, since the cache block is the minimum unit of size for the log update, the latest log can be identified for all the blocks in the cache data area 10321, and the each-cache-segment re-logging processing 410 for avoiding unnecessary re-logging may not be performed.

FIG. 23 is a flowchart of invalidation table registration processing 411 according to Embodiment 2. First, referring to the log header 103231 transmitted from the validity and invalidity management processing 407, a log sequence number of the log is registered in a log sequence number field of an entry of the invalidation table 10324 corresponding to a head block number of update data calculated from a memory address (step 4111). If the registration of the log sequence number is completed in the invalidation table 10324 for all the blocks that are updated based on the update data (Yes in step 4112), the processing ends. If the registration is not completed (No in step 4112), the registration in the invalidation table 10324 is performed for the next block number.

In the present embodiment, since it is necessary to perform the registration in the invalidation table for all the updated blocks, the overhead is larger than that of Embodiment 1. However, in the same manner as in Embodiment 1, there is no need to perform an operation of searching for each write processing or each asynchronous destage processing and only the operation of registration in the invalidation table is needed, the overhead is low and performance is improved.

In Embodiment 1, to avoid unnecessary re-logging in a workload having many cache hits and few asynchronous destages or a workload having a relatively small log size, the each-cache-segment re-logging is performed to reduce WA. However, in the present embodiment, since the entry of the invalidation table is for each block which is the minimum unit, unnecessary re-logging by the workload does not occur, and there is no need to perform forced re-logging. Therefore, it is possible to further reduce the overhead by WA or re-logging, and the performance is improved.

Embodiment 3

Next, Embodiment 3 will be described. The present embodiment differs from Embodiment 1 and Embodiment 2 in that an invalidation table is switched between two types including a granularity of cache segment unit and a granularity of update minimum unit. Accordingly, the overhead can be reduced compared to that in Embodiment 2, an amount of used memory can be reduced, and overwrite determination is possible when an invalidation table has the granularity of update minimum unit. Therefore, there are two differences: (1) a pointer to the invalidation table having the granularity of update minimum unit is added to the invalidation table having the cache segment unit, and (2) the invalidation table is switched by the invalidation table registration processing and the each-cache-segment re-logging processing.

FIG. 24 is a diagram showing an example of a configuration diagram of the memory 1032 according to Embodiment 3. A difference from FIG. 6 is that the memory 1032 includes a coarse granularity invalidation table 103241 and a fine granularity invalidation table 103242 instead of the invalidation table 10324.

Figure 25:
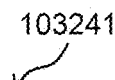
FIG. 25 is a diagram showing a structure of a coarse granularity invalidation table according to Embodiment 3.

FIG. 25 is a diagram showing a structure of the coarse granularity invalidation table 103241. The coarse granularity invalidation table 103241 differs from the invalidation table 10324 in FIG. 10 in Embodiment 1 in that there is a field for a pointer to the fine granularity invalidation table 103242. In the field of the pointer to the fine granularity invalidation table 103242, an address or an invalid value on the memory 1032 is stored.

FIG. 26 is a diagram showing a structure of the fine granularity invalidation table 103242. The fine granularity invalidation table 103242 differs from the invalidation table 10324 in FIG. 22 in Embodiment 2 in that the field for the cache block number is changed to a field for a block number in the cache segment. The fine granularity invalidation table 103242 is present for each cache segment.

FIG. 27 is a flowchart of invalidation table registration processing 412 according to Embodiment 3. There are two differences from FIG. 19. The first difference is that step 41207 is newly added after step 41206. After registering the log sequence number of the log in the coarse granularity invalidation table 103241 (step 41206), when a value of the field of the pointer to the fine granularity invalidation table 103242 indicates the fine granularity invalidation table 103242, the fine granularity invalidation table 103242 is deleted, and the value of the field of the pointer to the fine granularity invalidation table 103242 is changed to the invalid value (step 41207). The second difference is that when step 41204 is Yes, step 41208 and step 41209 are newly added. If the log size is smaller than the size of the cache segment 103211 (Yes in step 41204), it is determined whether the value of the field of the pointer to the fine granularity invalidation table 103242 of the cache segment 103211 entry in the coarse granularity invalidation table 103241 indicates the address on the memory 1032 (step 41208). If it indicates the address on the memory 1032 (Yes in step 41208), the log sequence number is registered in the entry of the block number in the indicated fine granularity invalidation table 103242 (step 41209), and the processing ends. If it does not indicate the address on the memory 1032 and is an invalid value (No in step 41208), the processing proceeds to processing of updating the total log size of the coarse granularity invalidation table 103241 (step 41210).

Figure 28:
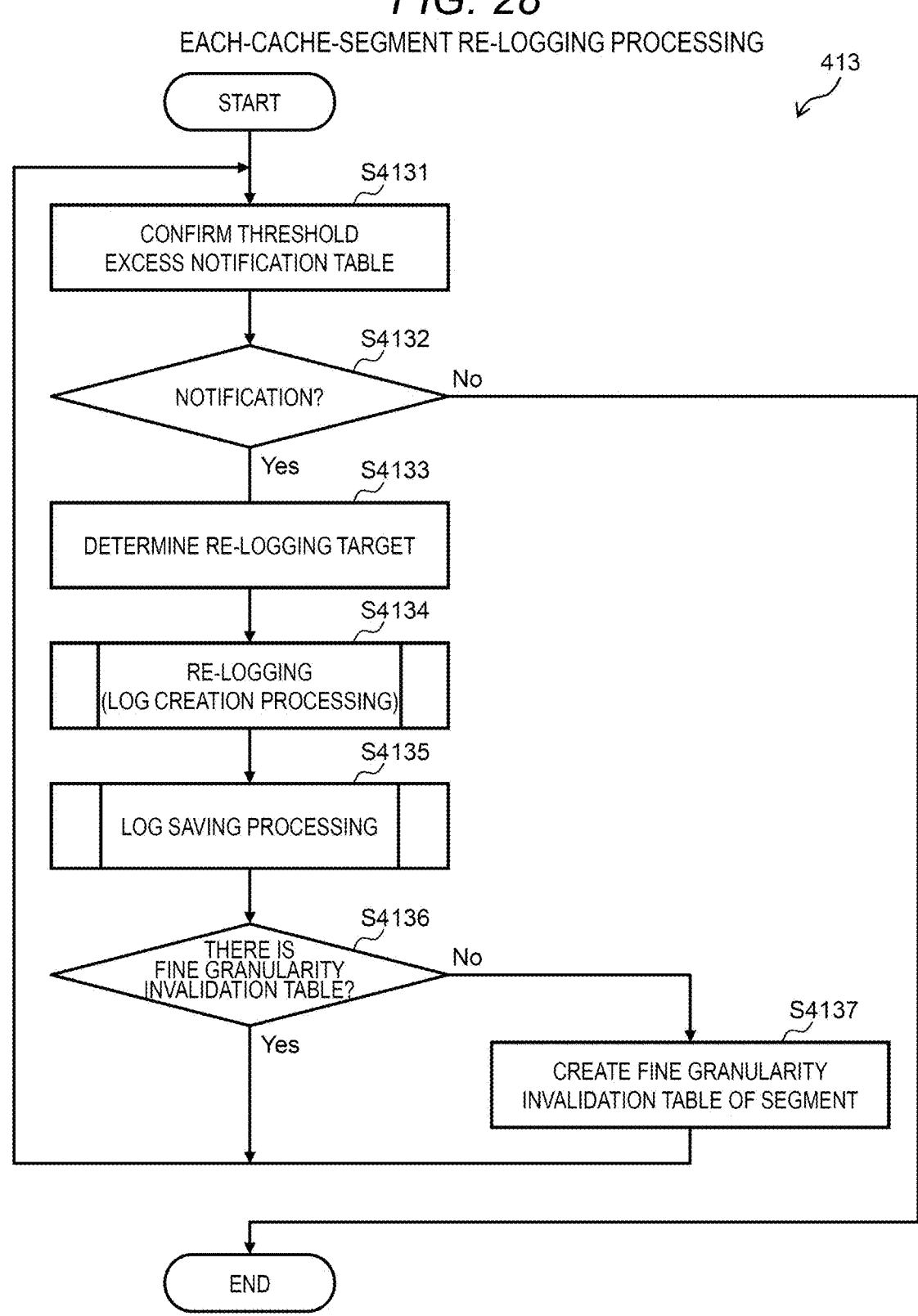
FIG. 28 is a flowchart of each-cache-segment re-logging processing according to Embodiment 3.

FIG. 28 is a flowchart of each-cache-segment re-logging processing 413 according to Embodiment 3. A difference from FIG. 21 is that step 4136 and step 4137 are newly added after step 4135. After the log saving processing is performed (step 4135), it is determined whether the value of the field of the pointer to the fine granularity invalidation table 103242 of the cache segment 103211 entry in the coarse granularity invalidation table 103241 indicates the address on the memory 1032 (step 4136). If it indicates the address on the memory 1032 (Yes in step 4136), the processing returns to the processing of confirming the threshold excess notification table (step 4131). If it does not indicate the address on the memory 1032 and is an invalid value, the fine granularity invalidation table 103242 is newly created, and the address on the memory 1032 is registered in the field of the pointer to the fine granularity invalidation table 103242 of the cache segment 103211 entry of the coarse granularity invalidation table 103241 (step 4137).

In the present embodiment, the advantages of Embodiment 1 and Embodiment 2 are combined. Embodiment 1 is suitable for a workload having many random write I/O or many sequential write I/O requests and having many asynchronous destages, and Embodiment 2 is suitable for a workload having many cache hits and few asynchronous destages or a workload having a relatively small log size. Therefore, in the present embodiment, the performance is improved by a workload such as a compression function in which write of compressed data written in a write-once format and write of metadata having a small log size and frequent overwrite are mixed.

Embodiment 4

Next, Embodiment 4 will be described. The present embodiment differs from Embodiment 3 in that an invalidation table having both a granularity of cache segment unit and a granularity of minimum update unit is included. Accordingly, an amount of used memory is larger than that of Embodiment 3, whereas the overhead by the switching processing on the invalidation table is smaller than that of Embodiment 3. Therefore, there are three differences including (1) there is no need to perform processing of switching the invalidation table by the invalidation table registration processing and the each-cache-segment re-logging processing, (2) since the each-cache-segment re-logging is unnecessary, there is no need to record the log size, and (3) two tables are referred to in the cache data log garbage collection processing.

FIG. 29 is a diagram showing a structure of the coarse granularity invalidation table 103241 according to Embodiment 4. The coarse granularity invalidation table 103241 according to Embodiment 4 differs from the invalidation table 10324 in FIG. 10 in Embodiment 1 in that there is no field for the total log size. In addition to the coarse granularity invalidation table 103241, the fine granularity invalidation table 103242 is also included. Here, it is assumed that the fine granularity invalidation table 103242 is equivalent to the invalidation table 10324 in FIG. 22. In the same manner as in Embodiment 2, since the cache block is the minimum unit of size for the log update, the latest log can be identified for all the blocks in the cache data area 10321, and the each-cache-segment re-logging processing 410 for avoiding unnecessary re-logging may not be performed. Therefore, the field of the total log size in the coarse granularity invalidation table 103241 is unnecessary.

The cache data log garbage collection processing is different from the cache data log garbage collection processing 409 of FIG. 20 in Embodiment 1. A difference from Embodiment 1 is processing of determining a re-logging target (step 4092). In Embodiment 1, the log sequence number of the invalidation table 10324 is compared with the log sequence number of the log header 103231. If the log sequence number in the log header 103231 is newer, the log is determined to be the re-logging target. In the present embodiment, the log sequence numbers of the coarse granularity invalidation table 103241, the fine granularity invalidation table 103242, and the log header 103231 are compared, and when the log sequence number of the log header 103231 is newer, the log is determined to be the re-logging target.

In all of the embodiments of the present invention, the granularity of the size of entry in the invalidation table is set for each cache segment size or each block size, and the size of entry in the invalidation table may be set freely. At this time, when the log is a cache data log having a size equal to or larger than the size of the entry in the invalidation table or a destage log, the log sequence number field of the invalidation table is updated. That is, when the entire area of the range on the cache data area corresponding to the entry in the invalidation table is rewritten by the log, the log sequence number field of the invalidation table is updated.

In Embodiment 1 and Embodiment 3, the size of re-logging by the each-cache-segment re-logging processing is set by the size of the cache segment, but may be set to any size. For example, the entry size of the invalidation table and the size of re-logging by the each-cache-segment re-logging processing may be half of the cache segment size. At this time, in the invalidation table registration processing 408 of FIG. 19 and the invalidation table registration processing 412 of FIG. 26, the processing of determining whether the log size is smaller than the cache segment size (step 4084 or step 41204) is changed to processing of determining whether the log size is smaller than half of the cache segment size. In the each-cache-segment re-logging processing 410 of FIG. 21, the re-logging target is determined in a size unit of the cache segment (step 4103), and the re-logging is performed for each cache segment (step 4104), but now each processing is performed in units of half size of the cache segment size.

In Embodiment 3 and Embodiment 4, two types of invalidation tables of the coarse granularity invalidation table and the fine granularity invalidation table are used, and three or more types of invalidation tables may be used. For example, a case is considered in which three types of invalidation tables including first stage, second stage, and third stage invalidation tables are switched in a descending order of granularity. At this time, the processing flow is different in the invalidation table registration processing 412 of FIG. 27. If the log type is a cache data log (Yes in step 41202) and the log size is confirmed (step 41203), when the log size is equal to or larger than the entry size of the first stage invalidation table (No in step 41204), the processing proceeds to step 41206 as in FIG. 27. If the log size is smaller than the entry size of the first stage invalidation table (Yes in step 41204), it is confirmed whether there is a pointer to the second stage invalidation table in the first stage invalidation table (step 41208). If there is a pointer (Yes in step 41208), it is confirmed whether the log size is smaller than the entry size of the second stage invalidation table. If the log size is smaller, similarly to the case of the first stage, it is confirmed whether there is a pointer to the third stage invalidation table in the second stage invalidation table. When the log size is equal to or larger than the entry size of the second stage invalidation table, the log sequence number is registered in the entry of the second stage invalidation table.

As described above, the system of the disclosure is the storage system 100 including: the nonvolatile storage device 1033; a processor configured to operate as the storage controller 1052 for processing read and write from and to the storage device 1033; and the memory 1032, in which the storage device 1033 has a permanent area in which data is destaged and permanently stored and a cache data log area 10332 in which a cache data log is stored to make the cache data log non-volatile, the memory 1032 has a cache data area, and the processor is configured to when receiving a write request, store data related to the write request in the cache data area provided in the memory 1032, create a log header having a sequence number related to memory storage of the data, store the log header and the data stored in the memory in the cache data log area 10332 of the storage device 1033, respond to a request source of the write request, and register the sequence number of the created log header in an invalidation table 10324, destage the data stored in the memory 1032 to the permanent area of the storage device 1033, create a log header having a sequence number related to the destage, and register the sequence number in the invalidation table 10324, and when the cache data log area of the storage device 1033 is collected by a garbage collection method, delete a log header having a sequence number older than the sequence number registered in the invalidation table 10324 and data related to the log header from the cache data log area 10332 to release the storage area.

This configuration and operation can improve the performance of the storage system.

The cache data area has a plurality of partial areas, and for each of the partial areas, the destage is performed, the sequence numbers are compared, and the storage area is released.

When all pieces of data in one of the partial areas are overwritten, a log header related to the overwriting is created, and a sequence number of the log header is registered in the invalidation table.

These operations enable efficient management of the garbage collection target area, contributing to improved performance.

According to the system of the disclosure, the log header includes address information indicating a range of the write or a range of the destage and a sequence number indicating a log order, and when the cache data log area of the storage device is collected by the garbage collection method, the processor specifies a corresponding partial area based on the address information of the log header that is a determination target of collection necessity, and compares a sequence number associated with the specified partial area in the invalidation table with the sequence number of the log header to determine whether collection is necessary.

Therefore, it is possible to determine the log before the asynchronous destage as unnecessary by the garbage collection and to ensure the consistency.

The processor is configured to when the cache data log area of the storage device is collected by the garbage collection method, specify the corresponding partial area based on the address information of the log header that is the determination target of collection necessity, compare the sequence number associated with the specified partial area in the invalidation table with the sequence number of the log header, and determine, if the sequence number of the log header is a number earlier than the sequence number stored in the invalidation table, a log indicated by the log header to be unnecessary and perform collection, and determine, if the sequence number of the log header is not a number earlier than the sequence number stored in the invalidation table, the log indicated by the log header to be necessary, create the log in a new area of the cache data log area, and perform the collection.

Therefore, the log before the log managed by the table can be set to be unnecessary, and the subsequent log can be retained to perform the garbage collection, thereby ensuring consistency.

According to the system of the disclosure, the invalidation table holds a total size of the log header and data of the cache data log area for each of the partial areas, and the processor selects a log header and data as a target of the collection based on the total size.

Therefore, unnecessary re-logging can be avoided, WA can be reduced, and performance is improved.

The invention is not limited to the above-described embodiments, and includes various modifications.

For example, in the embodiments described above, in each range obtained by dividing the memory 1032 into cache segments, the sequence number of the log is registered, the total size of the logs is recorded, and the re-logging is performed. However, the memory 1032 may be the minimum unit of data and metadata. Further, a plurality of pieces of invalidation tables may be used. For example, the invalidation table divided for each cache segment and the invalidation table divided for each minimum unit of the data and the metadata may be switched and used, or both the invalidation table divided for each cache segment and the invalidation table divided for each minimum unit of the data and the metadata may be used.

The embodiments described above have been described in detail to facilitate understanding of the prevent invention, and the present invention is not necessarily limited to those including all the configurations described above. The configurations may not only be deleted, but also be replaced or added.

What is claimed is:

1. A storage system comprising:
a nonvolatile storage device;
a processor configured to operate as a storage controller for processing read and write from and to the storage device; and
a memory,
wherein the nonvolatile storage device has a permanent area in which data is destaged and permanently stored and a cache data log area in which a cache data log is stored to make the cache data log non-volatile, the memory having a cache data area, and the processor is configured to:

when receiving a write request, store data related to the write request in the cache data area provided in the memory, destage the data stored in the memory to the permanent area of the nonvolatile storage device, and collect the cache data log area of the nonvolatile storage device by a garbage collection method, wherein during garbage collection, the processor is further configured to:

when storing the data in the cache data area provided in the memory, create a log header having a sequence number indicating a log order related to memory storage of the data, store the log header and the data stored in the memory in the cache data log area of the storage device, respond to a request source of the write request, and register the log header in a cache data log header management list provided in the memory corresponding to the cache data log area, upon the destaging, destage the data stored in the memory to the permanent area of the storage device, create a log header having a sequence number of a log related to the destaging, and register the sequence number in an area corresponding to an address of the memory where the destaged data has been stored, in an invalidation table, when collecting the cache data log area of the storage, compare the sequence number of the log header registered in the invalidation table with the sequence number of the log header stored in the cache data log header management list in the memory with respect to each target address; and delete a log header having a sequence number older than the sequence number of the log header registered in the invalidation table and data related to the log header from the cache data log area to release the storage area.

2. The storage system of claim 1, wherein the cache data area has a plurality of partial areas, and for each of the partial areas, the destage is performed, the sequence numbers are compared, and the storage area is released.

3. The storage system of claim 2, wherein a size of the partial area is equal to a minimum unit of data stored in the memory.

4. The storage system of claim 1, wherein when all pieces of data in one of the partial areas are overwritten, a log header related to the overwriting is created, and a sequence number of the log header is registered in the invalidation table.

5. The storage system of claim 1, wherein a partial area of the cache data area of the memory has a first partial area having a large size and configured to store data and a second partial area having a small size and configured to store metadata, and the corresponding cache data log area is collected for each of the partial areas.

6. The storage system according to claim 1, wherein when the sequence number registered in the invalidation table is the sequence number of the log header regarding the destaging, the sequence number of the log header of the cache data log area becomes older than the sequence number registered in the invalidation table; and when the sequence number registered in the invalidation table is the sequence number of the log header regarding the memory storage of the data, the sequence number of the log header of the cache data log area does not become older than the sequence number registered in the invalidation table.

7. A storage system comprising, a nonvolatile storage device;

a processor configured to operate as a storage controller for processing read and write from and to the storage device; and a memory, wherein the storage device has a permanent area in which data is destaged and permanently stored and a cache data log area in which a cache data log is stored to make the cache data log non-volatile, the memory has a cache data area, the processor is configured to:

when receiving a write request, store data related to the write request in the cache data area provided in the memory, create a log header having a sequence number related to memory storage of the data, store the log header and the data stored in the memory in the cache data log area of the storage device, respond to a request source of the write request, and register the sequence number of the created log header in an invalidation table, destage the data stored in the memory to the permanent area of the storage device, create a log header having a sequence number related to the destage, and register the sequence number in the invalidation table, when the cache data log area of the storage device is collected by a garbage collection method, delete a log header having a sequence number older than the sequence number registered in the invalidation table and data related to the log header from the cache data log area to release the storage area when the cache data log area of the storage device is collected by the garbage collection method, specify the corresponding partial area based on the address information of the log header that is the determination target of collection necessity, compare the sequence number associated with the specified partial area in the invalidation table with the sequence number of the log header, and determine, if the sequence number of the log header is a number earlier than the sequence number stored in the invalidation table, a log indicated by the log header to be unnecessary and perform collection, and determine, if the sequence number of the log header is not a number earlier than the sequence number stored in the invalidation table, the log indicated by the log header to be necessary, create the log in a new area of the cache data log area, and perform the collection.

8. The storage system of claim 7, wherein the invalidation table holds a total size of the log header and data of the cache data log area for each of the partial areas, and the processor selects a log header and data as a target of the collection based on the total size.

9. A storage control and garbage collection method for controlling a storage system, the storage system including a nonvolatile storage device, a processor configured to operate as a storage controller for processing read and write from and to the storage device, and a memory, the storage device having a permanent area in which data is destaged and permanently stored and a cache data log area in which a cache data log is stored to make the cache data log non-volatile, the memory having a cache data area, the storage control and garbage collection method comprising:

by the processor, when receiving a write request, storing data related to the write request in the cache data area provided in the memory;

destaging the data stored in the memory to the permanent area of the storage device;

collecting the cache data log area of the storage device;

when storing the data in the cache data area provided in the memory, creating a log header having a sequence number indicating a log order related to memory storage of the data, storing the log header and the data stored in the memory in the cache data log area of the storage device, responding to a request source of the write request, and registering the log header in a cache data log header management list provided in the memory corresponding to the cache data log area;

upon the first destaging step, destaging the data stored in the memory to the permanent area of the storage device, creating a log header having a sequence number of a log related to the first destaging step, and registering the sequence number in an area corresponding to an address of the memory where the destaged data has been stored, in an invalidation table;

when collecting the cache data log area of the storage device, comparing the sequence number of the log header registered in the invalidation table with the sequence number of the log header stored in the cache data log header management list in the memory with respect to each target address; and deleting a log header having a sequence number older than the sequence number of the log header registered in the invalidation table and data related to the log header from the cache data log area to release the storage area.

\* \* \* \* \*